US006223413B1

United States Patent
Crocker et al.

(10) Patent No.: US 6,223,413 B1
(45) Date of Patent: May 1, 2001

(54) APPARATUS AND METHOD FOR POSITIONING TOOLING

(75) Inventors: Robert B. Crocker, Buffalo; Kenneth Benczkowski, Cheektowaga, both of NY (US)

(73) Assignee: General Electro Mechanical Corporation, West Seneca, NY (US)

( * ) Notice: Subject to any disclaimer, the term of this patent is extended or adjusted under 35 U.S.C. 154(b) by 0 days.

(21) Appl. No.: 09/239,082

(22) Filed: Jan. 27, 1999

Related U.S. Application Data

(60) Provisional application No. 60/072,660, filed on Jan. 27, 1998.

(51) Int. Cl.$^7$ ............................................. B21J 15/10
(52) U.S. Cl. .................... 29/524.1; 29/525.06; 29/34 B; 29/243.53; 409/202; 409/212; 227/111
(58) Field of Search .............................. 29/34 B, 33 K, 29/464, 524.1, 525.02, 525.06, 243.53; 409/202, 212; 227/111

(56) References Cited

U.S. PATENT DOCUMENTS

| | | | |
|---|---|---|---|
| 4,583,891 | * 4/1986 | Eschenfelder et al. | 409/212 |
| 4,658,485 | * 4/1987 | Yang | 409/202 |
| 4,759,109 | * 7/1988 | Mason et al. | 29/524.1 |
| 4,966,323 | * 10/1990 | Speller, Sr. et al. | 227/111 |
| 5,033,174 | * 7/1991 | Zieve | 29/34 B |
| 5,154,643 | * 10/1992 | Catania et al. | 29/34 B |
| 5,379,508 | * 1/1995 | Givler et al. | 29/524.1 |
| 5,477,597 | * 12/1995 | Catania et al. | 29/34 B |
| 5,611,130 | * 3/1997 | Rummell et al. | 29/34 B |
| 5,699,599 | * 12/1997 | Zieve | 29/34 B |
| 5,836,068 | * 11/1998 | Bullen | 29/34 B |
| 5,848,458 | * 12/1998 | Bullen | 29/33 K |
| 6,101,704 | * 8/2000 | Mangus et al. | 29/524.1 |

FOREIGN PATENT DOCUMENTS

| | | | |
|---|---|---|---|
| 1158084 | * 12/1983 | (CA) | 409/202 |
| 1-222809 | * 9/1989 | (JP) | 409/211 |
| 1103930 | * 7/1984 | (SU) | 29/34 B |
| 17774905 | * 11/1992 | (SU) | 409/202 |

* cited by examiner

Primary Examiner—A. L. Wellington
Assistant Examiner—Erica D. Ergenbright
(74) Attorney, Agent, or Firm—Hodgson Russ LLP

(57) ABSTRACT

Apparatus and method for positioning tooling for operation on a curved workpiece wherein a gantry beam assembly having a movable head assembly thereon carrying tooling is pivotally connected on a pivot axis to a pair of spaced apart pedestals each having a longitudinal axis disposed substantially perpendicular to the pivot axis and wherein the workpiece is supported on a fixture between the pedestals and so that the gantry beam assembly extends along the workpiece. The pivot axis of the gantry beam assembly is moved along the longitudinal axes of the pedestals, the pivot axis of the gantry beam assembly is moved along a path substantially perpendicular to the longitudinal axes of the pedestals and the head assembly is moved along the gantry beam assembly. The foregoing operations move the head assembly relative to the workpiece enabling the tooling to perform operations thereon. The gantry beam assembly is pivoted about the pivot axis and the head assembly is pivoted about an axis substantially perpendicular to the pivot axis for normalization of the head assembly relative to the workpiece. The gantry beam assembly can be tilted along a plane substantially parallel to the longitudinal axes of the pedestals to accommodate frustoconical and similar shaped workpieces. The gantry beam assembly can be provided with gimbal connections to the pedestals to provide additional degrees of freedom for operation on workpieces having compound curvatures.

12 Claims, 22 Drawing Sheets

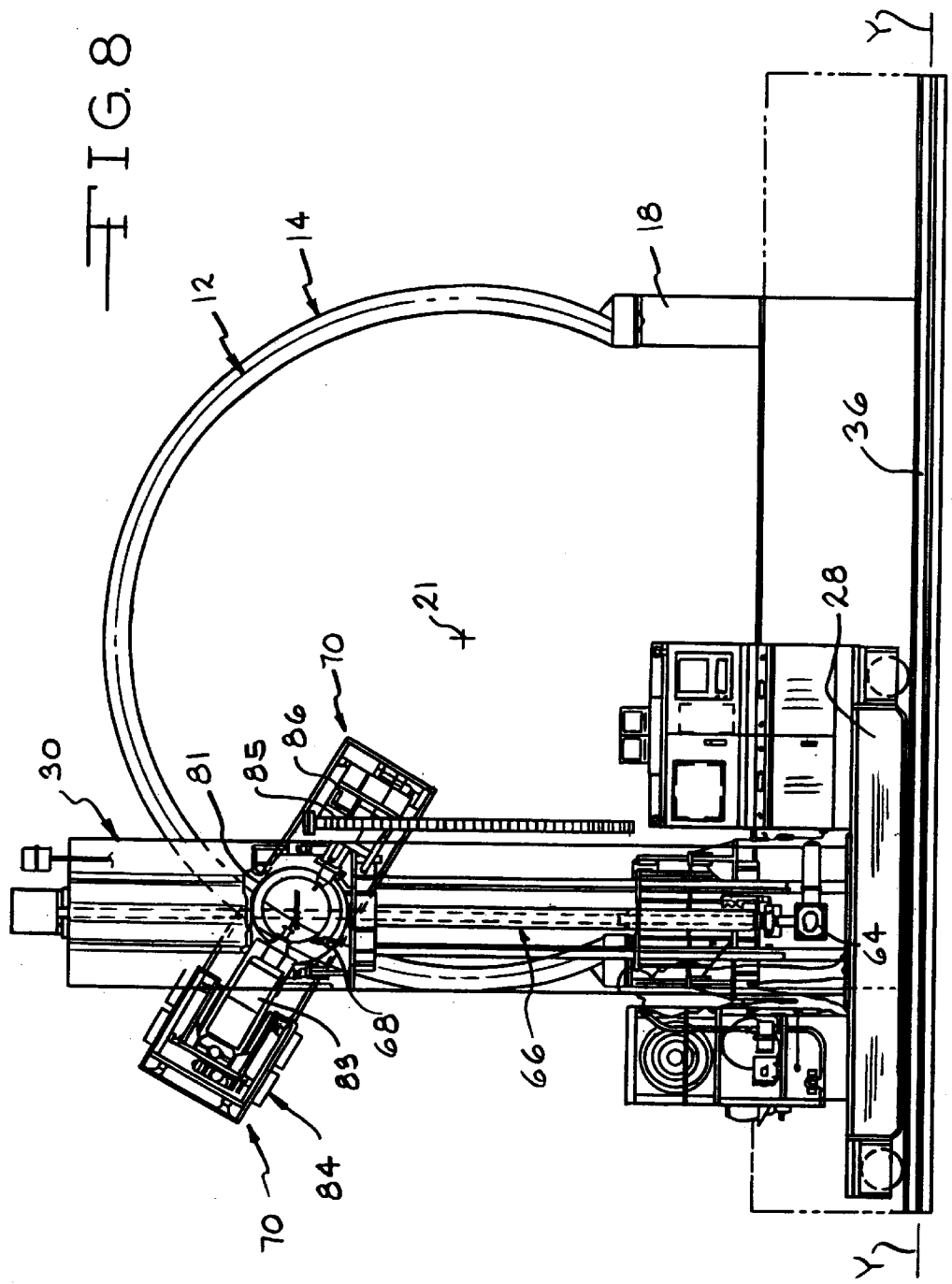

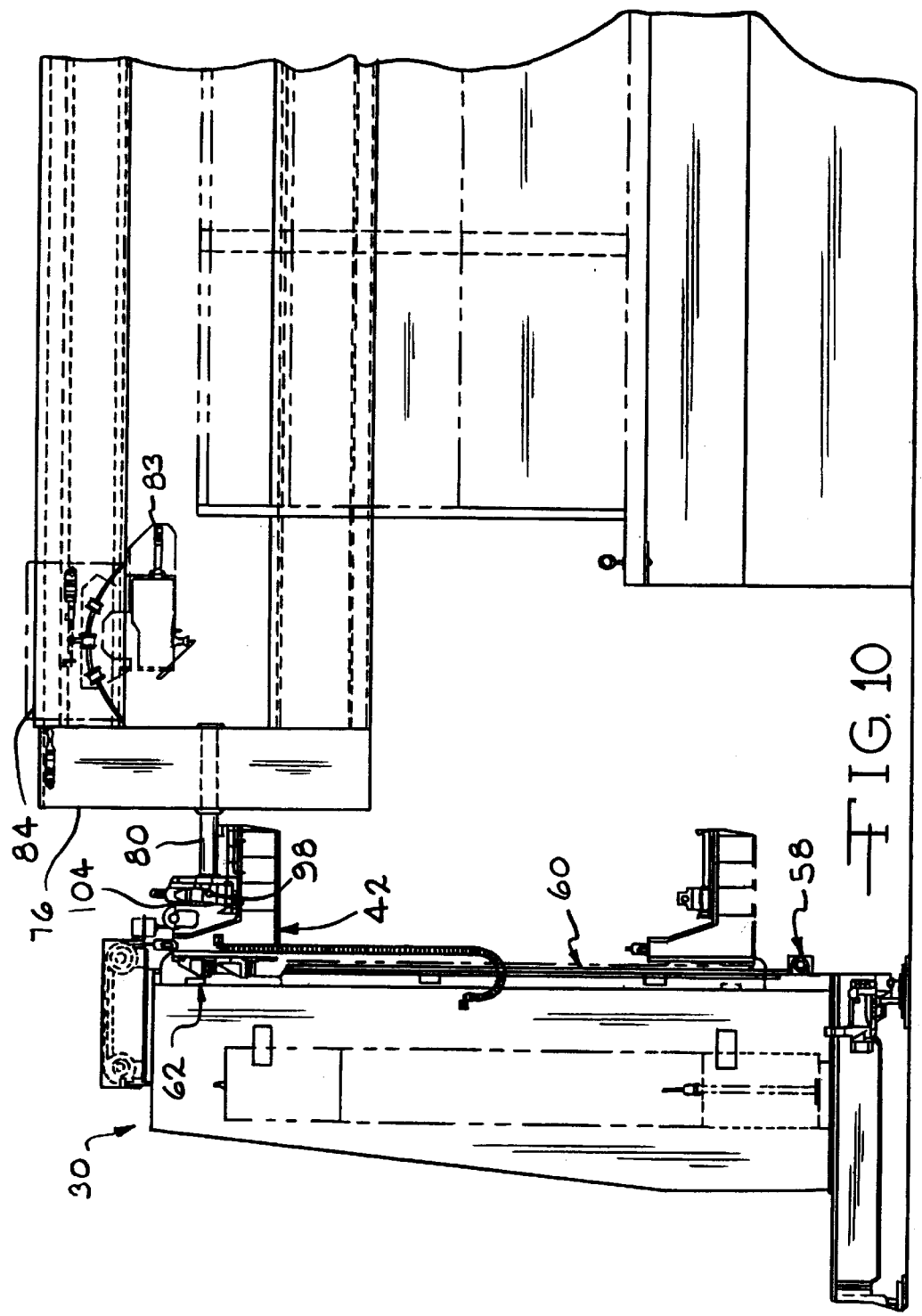

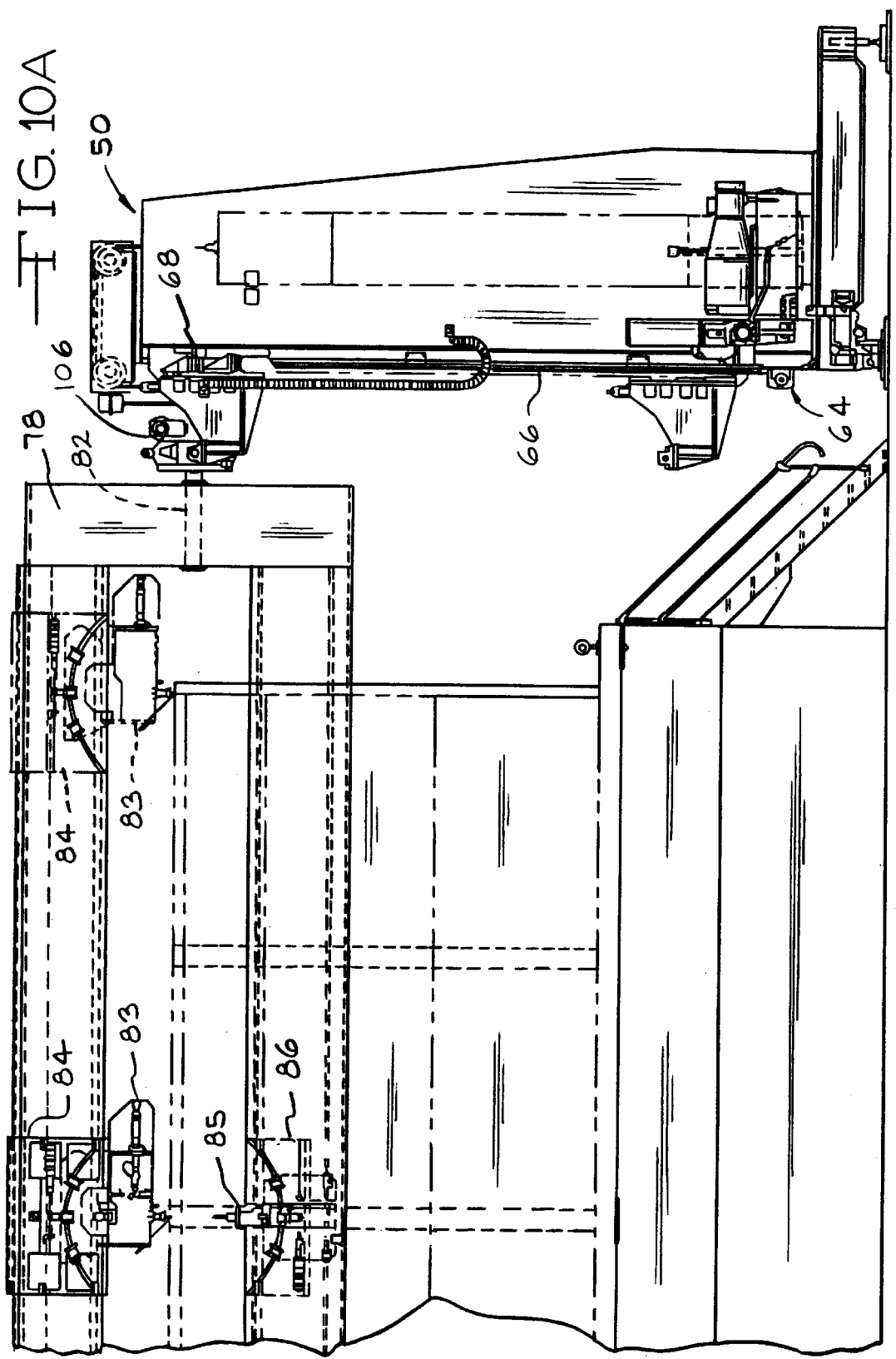

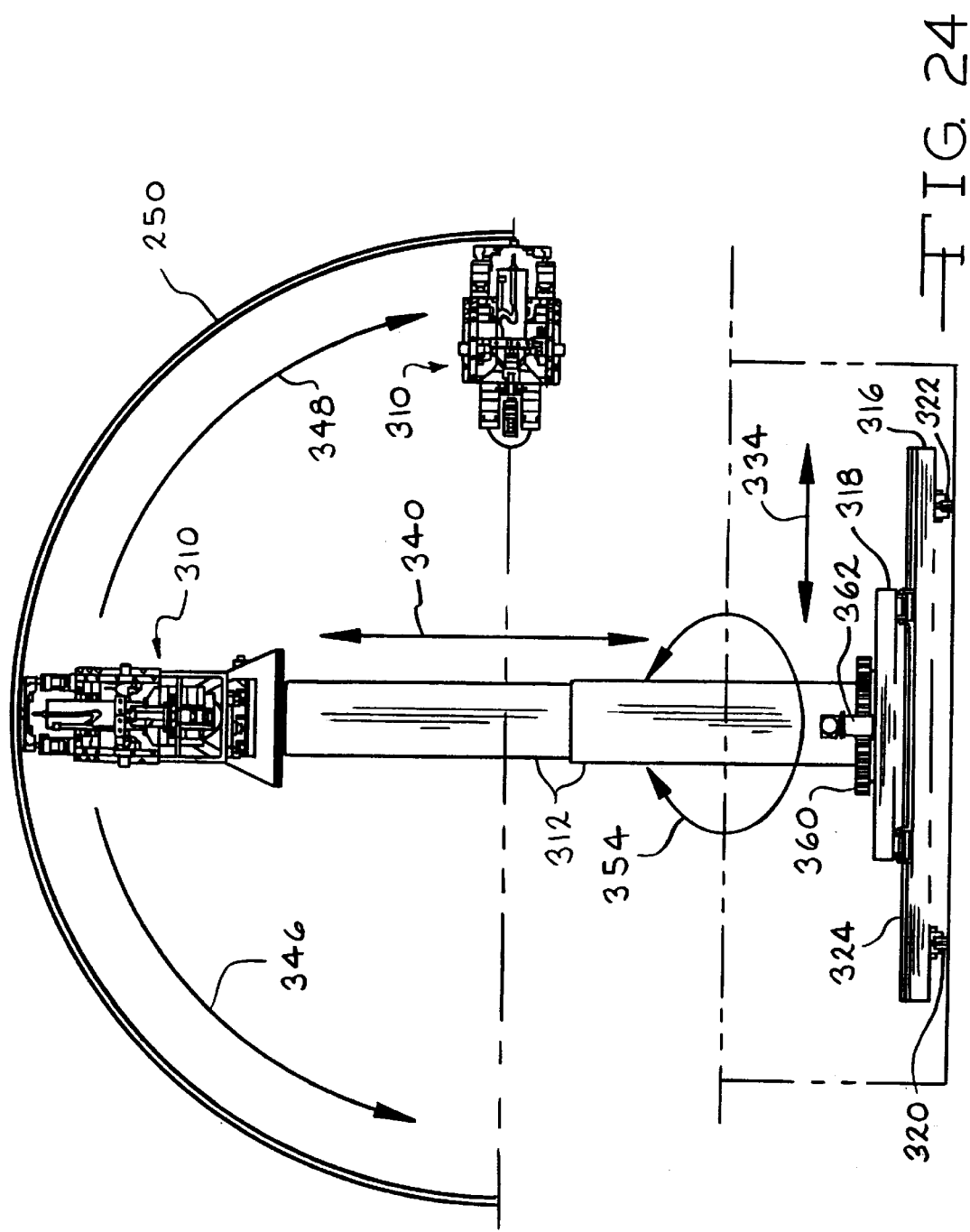

APPARATUS AND METHOD FOR POSITIONING TOOLING

CROSS REFERENCE TO A RELATED APPLICATION

Applicants claim priority on U.S. Provisional Application Ser. No. 60/072,660 filed Jan. 27, 1998 entitled "Apparatus For Positioning Tooling".

BACKGROUND OF THE INVENTION

The present invention relates generally to positioning tooling with respect to a workpiece, and more particularly to an apparatus for positioning tooling with respect to a curvilinear workpiece.

Presently, the installation of fasteners during the assembly of aircraft wings, fuselages, and other components requires large machines, including conventional C-shaped tooling machines. Conventional C-shaped tooling machines may be equipped to drill, upset rivets, seal riveted joints, and perform other work on the constituent parts of the aircraft components. While such C-shaped machines operate effectively with workpieces of certain sizes and configurations, they encounter limitations wherein due to the configuration and/or size of the workpiece, access to the opposite sides thereof is limited. Also, the use of these C-shaped machines can require very complicated structures and procedures to support the workpiece in order to accommodate the same, and can also require the workpiece to be constantly repositioned, which consumes valuable production time. There is thus a need for an apparatus for positioning tooling overcomes such limitations.

The present invention provides a novel solution to the long felt need for an apparatus for positioning tooling with respect to large curvilinear workpieces.

SUMMARY OF THE INVENTION

The present invention provides apparatus and method for positioning tooling for operation on a curved workpiece wherein a gantry beam assembly having a movable head means thereon carrying tooling is pivotally connected on a pivot axis to a pair of spaced apart pedestals each having a longitudinal axis disposed substantially perpendicular to the pivot axis and wherein the workpiece is supported on a fixture between the pedestals and so that the gantry beam assembly extends along the workpiece. The pivot axis of the gantry beam assembly is moved along the longitudinal axes of the pedestals, the pivot axis of the gantry beam assembly is moved along a path substantially perpendicular to the longitudinal axes of the pedestals and the head means is moved along the gantry beam assembly. The foregoing operations move the head means relative to the workpiece enabling the tooling to perform operations thereon. The gantry beam assembly is pivoted about the pivot axis and the head means is pivoted about an axis substantially perpendicular to the pivot axis for normalization of the head means relative to the workpiece. The gantry beam assembly can be tilted along a plane substantially parallel to the longitudinal axes of the pedestals to accommodate frustoconical and similar shaped workpieces. The gantry beam assembly can be provided with gimbal connections to the pedestals to provide additional degrees of freedom for operation on workpieces having compound curvatures.

The foregoing and additional advantages and characterizing features of the present invention will become clearly apparent upon a reading of the ensuing detailed description together with the included drawing.

BRIEF DESCRIPTION OF THE DRAWINGS

FIG. 1A shows a side elevational view of the operator's console for use with the apparatus of FIG. 1.

FIG. 8 shows a view similar to FIG. 3 and illustrating movement of the carriage and heads relative to the workpiece.

FIG. 10 shows an enlarged view of FIG. 9.

FIG. 24 is an end elevational view, partly diagrammatic, of the apparatus of FIGS. 22 and 23.

DETAILED DESCRIPTION OF THE INVENTION

Figure 1:
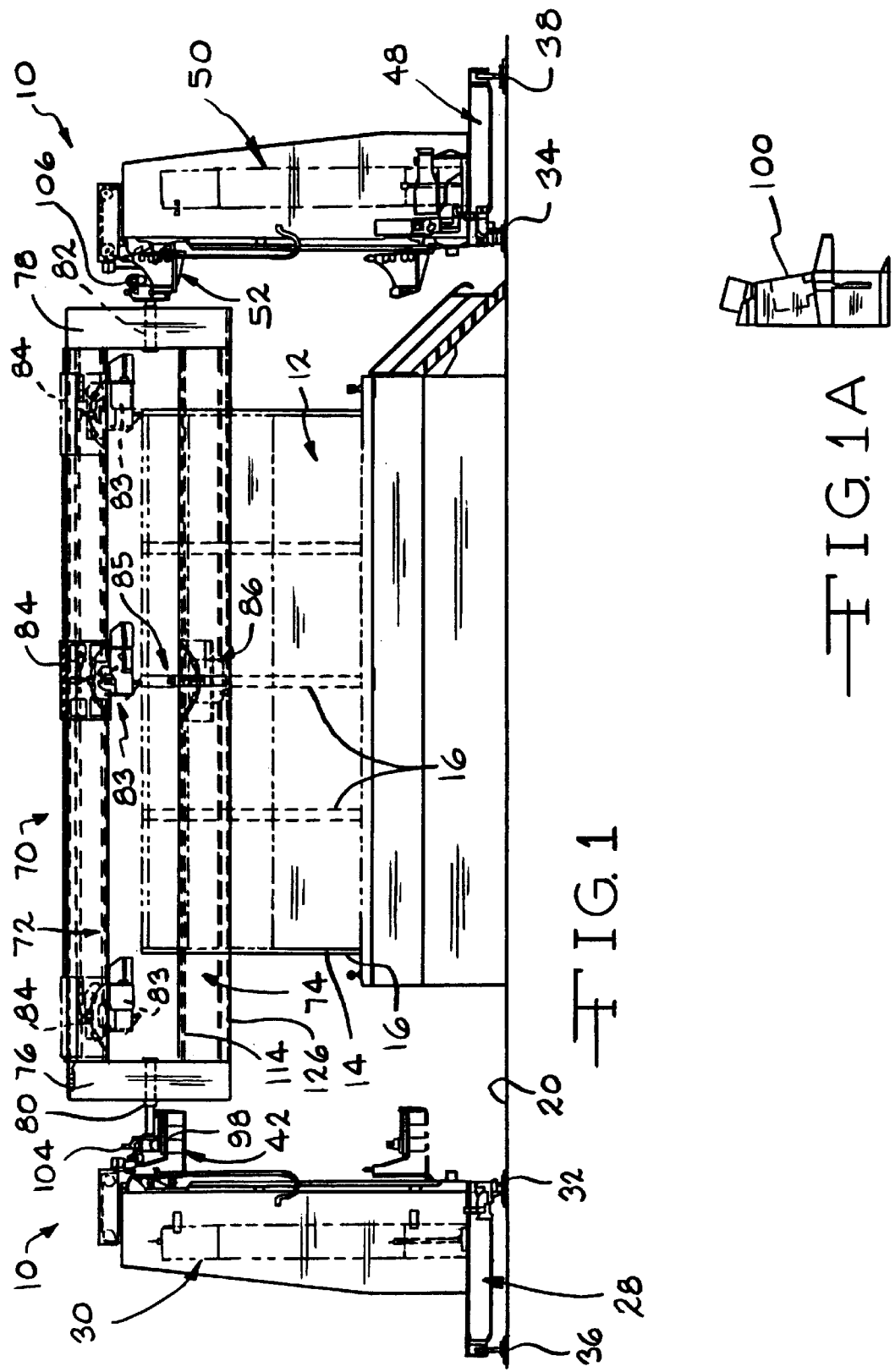
FIG. 1 shows a side elevational view of the apparatus of the present invention, as it would appear in use with a curvilinear workpiece.

The present invention, illustrated in the drawings, provides an apparatus 10 for positioning tooling which may be adapted to carry tool assemblies for drilling, fastener (rivet) upsetting, sealant dispensing, rivet shaving, measuring and inspecting, routing and other tool assemblies known to those skilled in the art which are employed to perform operations on a workpiece 12. Workpiece 12, having a single panel or multi-panels, has a generally curved and/or compound curvature, and is supported in fixture 14, having an upper framework 16 and a lower supporting base 18 which rests on a surface 20, which may be the floor of the factory. Workpiece 12 has a longitudinal axis 22 which, in the present illustration, is disposed substantially parallel to the plane of supporting surface 20. Workpiece 12 is illustrated as an airplane fuselage section, generally cylindrically shaped and having seven panels about its circumference, it being understood that the apparatus 10 of the present invention will work equally well with fuselage sections having less or greater than seven panels about their circumference. Also, it is understood that the present invention will work equally well with other curvilinear workpieces, that is with workpieces which are curved in a first direction extending along a plane substantially perpendicular to the longitudinal axis of the workpiece and which are curved in a second direction extending along a plane substantially parallel to the workpiece longitudinal axis. In addition, although a fuselage section is depicted in the drawing figures, the present invention will work equally well with other arcuate or curved workpieces. Also, while the present invention is particularly advantageous for work on curved workpieces, it can be used with flat workpieces including those having flat sections spliced at an angle or angled joint.

Figures 9, 9A:
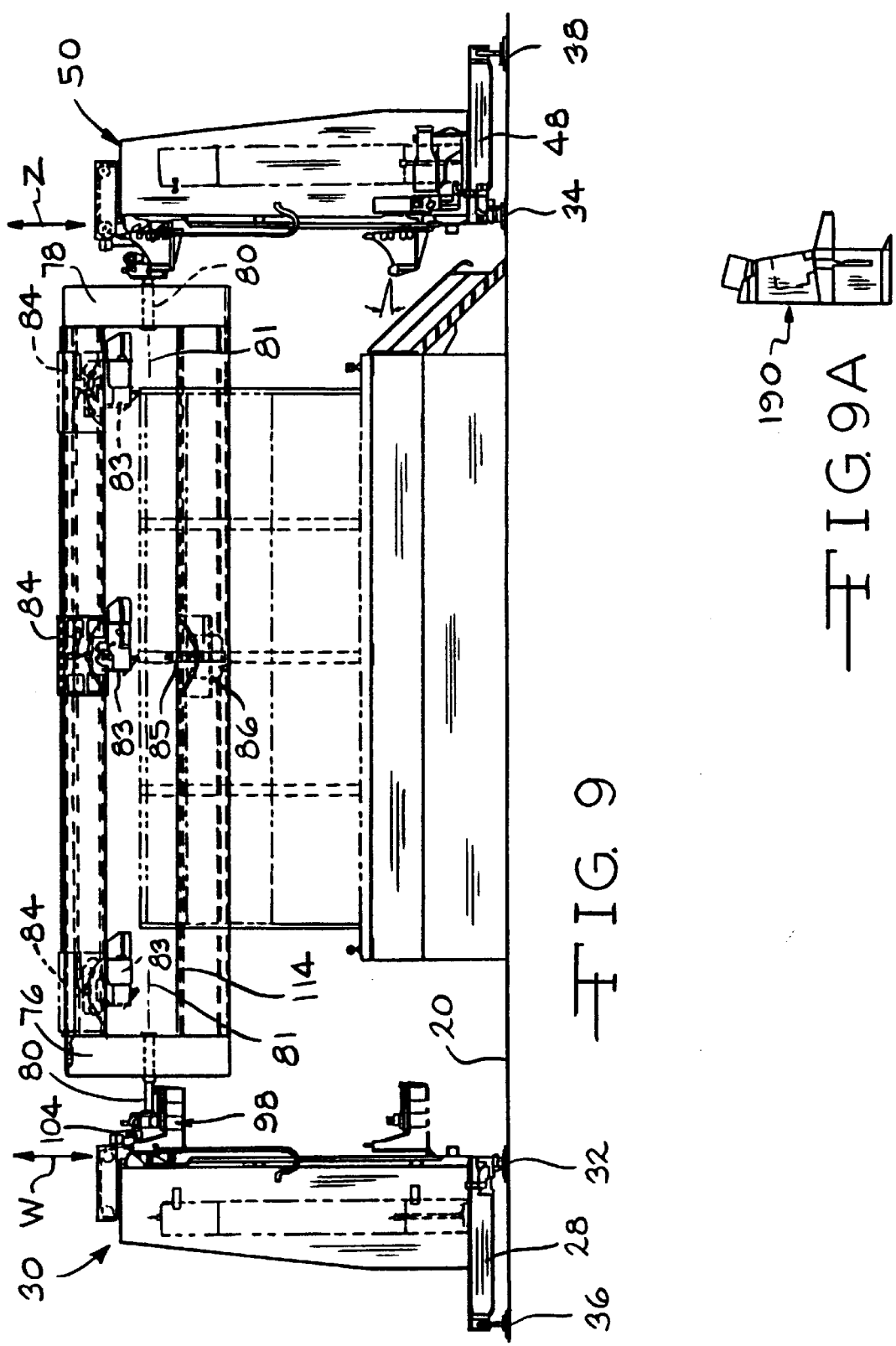
FIG. 9 shows an enlarged view of FIG. 1.
FIG. 9A shows an enlarged view of FIG. 1A.

Referring now to FIG. 1 and the enlarged views of FIGS. 9 and 10, the apparatus 10 of the present invention for positioning tooling comprises a carriage 28 supporting a first pedestal 30 and a carriage 48 supporting a second pedestal 50, both of which carriages 28, 48 are controllably movable on a pair of ground tracks 32, 34 which extend along surface 20 in a mutually parallel relation. Ground tracks 32, 34 extend along a direction designated the Y-axis, seen also in FIG. 8. Controlled drive means on the Y-axis carriages 28, 48 engage tracks 32 and 34 in a manner which will be described. Movement of carriages 28, 48 also is supported by rails 36 and 38, located outwardly of tracks 32, 34 and which receive wheels or rollers on carriages 28, 48. Perpendicular to the Y-axis, and defined along the longitudinal axis of the first pedestal 30 is the W-axis, and defined along the longitudinal axis of the second pedestal 50 is the Z-axis, as shown in FIG. 9. In the illustrated arrangement, the Y-axis is generally horizontal, and the W-axis and Z-axis are generally vertical. As shown in FIGS. 1, 9, and 10 each gantry pedestal 30 and 50 is located outside of the fuselage section 12, i.e. spaced outwardly from the opposite ends of workpiece 12.

A gantry beam assembly 70, which in the embodiment of FIGS. 1–18 comprises a first beam 72 and a second beam 74, is pivotally mounted to the first and second pedestals 30 and 50, respectively. The first beam 72 and second beam 74 are in spaced generally parallel relation to one another and disposed with the longitudinal axes thereof substantially perpendicular to the W and Z axes. An X-axis, shown in FIG. 9, extends in a direction substantially parallel to the longitudinal axes of beams 72 and 74. The X-axis also extends substantially parallel to the longitudinal axis 22 of workpiece 12. The first and second beams 72 and 74, respectively, are attached at opposite ends thereof to first and second beam mounts 76 and 78, respectively. The first and second beam mounts 76 and 78, in turn, are pivotally connected to the first and second pedestals 30 and 50, respectively, by first and second pivot assemblies or shafts 80 and 82, respectively. An A-axis is defined along the common longitudinal axis of the first and second pivot assemblies 80 and 82 respectively, seen at 81 in FIG. 9. Axis 81 is the pivot axis of gantry assembly 70. First and second controlled rotating means 104 and 106, respectively, are connected to the first and second pivot assemblies 80 and 82, respectively, to rotate the gantry assembly 70 about the A-axis. Such rotation about the A-axis may be plus or minus about 115 degrees, as depicted in FIG. 8. The rotating means 104 and 106 each can comprise commercially available rotary actuators such as the combination of a pulsed electric meter motor and a reducing gear box.

Figure 7:
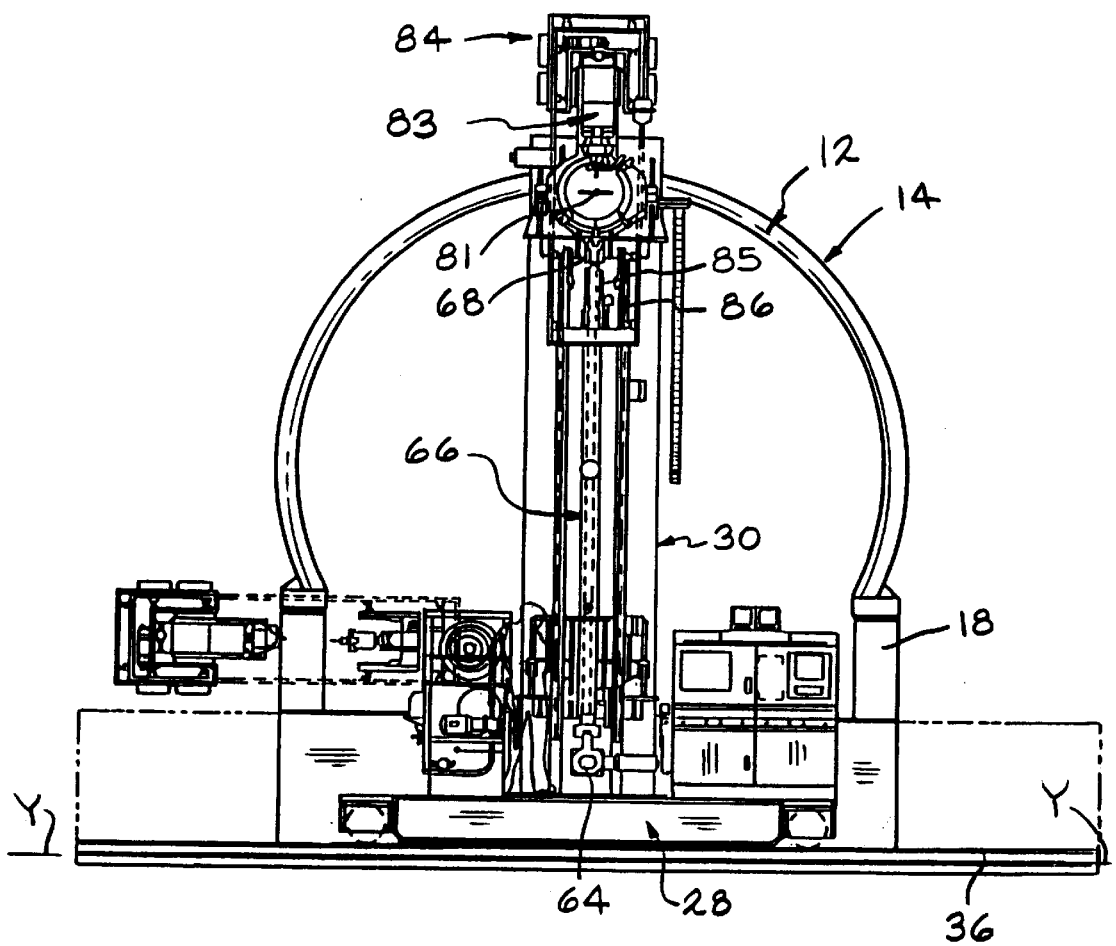
FIG. 7 shows an enlarged view of FIG. 3.
Figure 18:
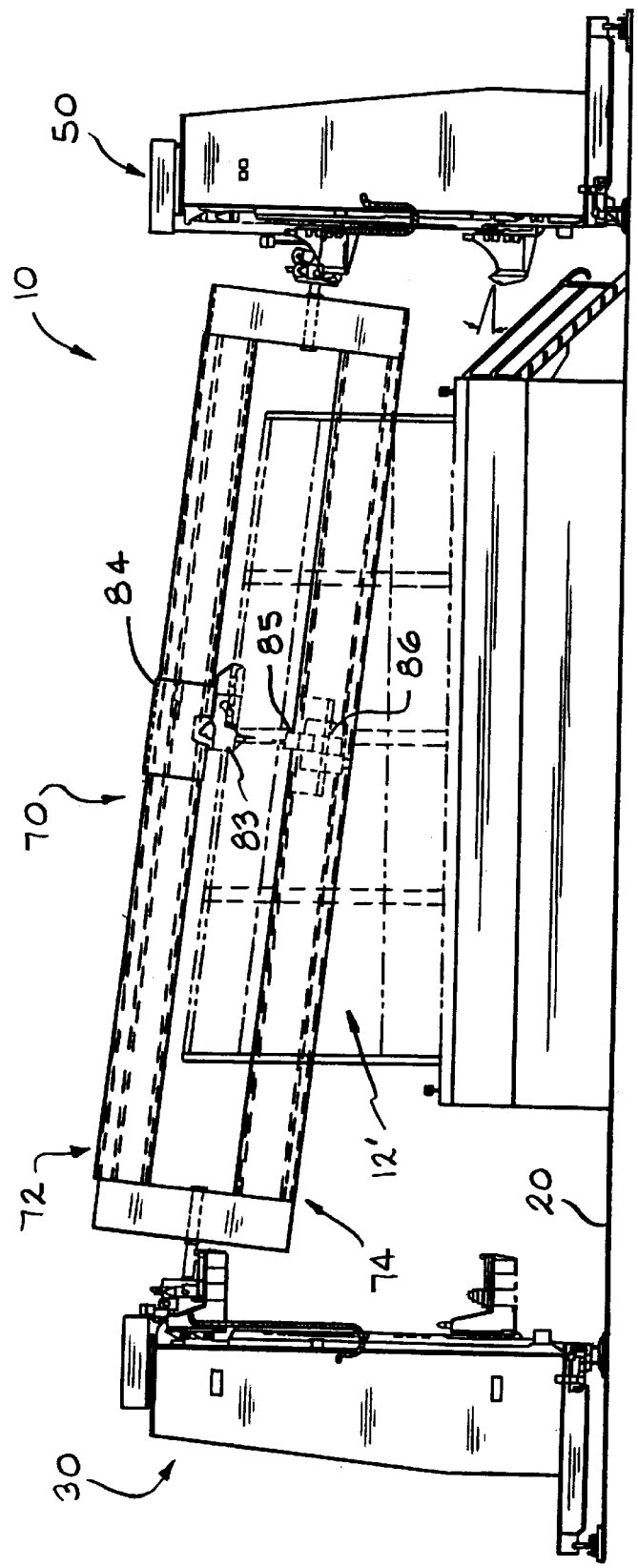
FIG. 18 is a side elevational view of the gantry assembly showing the tilting or skewing motion of the gantry assembly.

The first and second gantry pedestals 30 and 50, respectively, are equipped with first and second elevator means or carriages 42 and 52 respectively, which support the pivot assemblies 80 and 82 and rotating means 104 and 106, for controllably moving the gantry assembly 70 along the W-axis and Z-axis, respectively, i.e., vertically as viewed in the drawings. In particular, simultaneous and synchronized vertical movement of elevators 42 and 52 moves gantry assembly 70 in a vertical direction while maintaining the gantry 70 in a horizontal disposition as viewed in the drawings. In addition, one of the pivot assemblies, for example pivot assembly 80, is further equipped with a corresponding slip joint mechanism 98, which permits the gantry assembly 70 to be tilted. One illustrative arrangement for implementing slip joint mechanism 98 is a linear bearing set designated 100 in FIG. 10 of the type commercially available from THK or NSK. For example, the second elevator means or carriage 52 may be actuated to thus move the second pivot assembly 82 along the Z-axis, while the first elevator means or carriage 42 is not actuated, thus holding the first pivot assembly 80 stationary on the W-axis. The slip joint mechanism 98 accommodates tilting of gantry 70 while allowing pedestal 30 to remain in a vertical position. The result of this skewing of the Z-axis relative to the W-axis defines a b-axis movement which rotates about the Y-axis, described above. This is illustrated in FIG. 18 which shows apparatus 10 operating on a frustoconical workpiece $12^1$. The above described skewing may be to such a degree that the b-axis rotation is plus or minus 15 degrees relative to the Y-axis. Such skewing or b-axis rotation about the Y-axis provides versatility, so that gantry 70 may be tilted to accommodate curvilinear workpieces having compound curves and the like, i.e., curvature along the longitudinal axis of the workpiece. Only one of the pivot assemblies, in the foregoing illustration assembly 80, is provided with a slip joint so that proper reference/location information on gantry 70 can be maintained for the system control. The elevators or carriages 42 and 52 are indexed on linear bearings and are driven by dual ball screw and nut arrangements operated by dual synchronized servo motors. A drive motor 58, ball screw 60 and nut 62 is provided for carriage 42 as shown in FIG. 10, and a drive motor 64, ball screw 66 and nut 68 is provided for carriage 52 as shown in FIGS. 7, 8, and 10. Each axis is programmable with encoder feedback to the system control.

Figure 2:
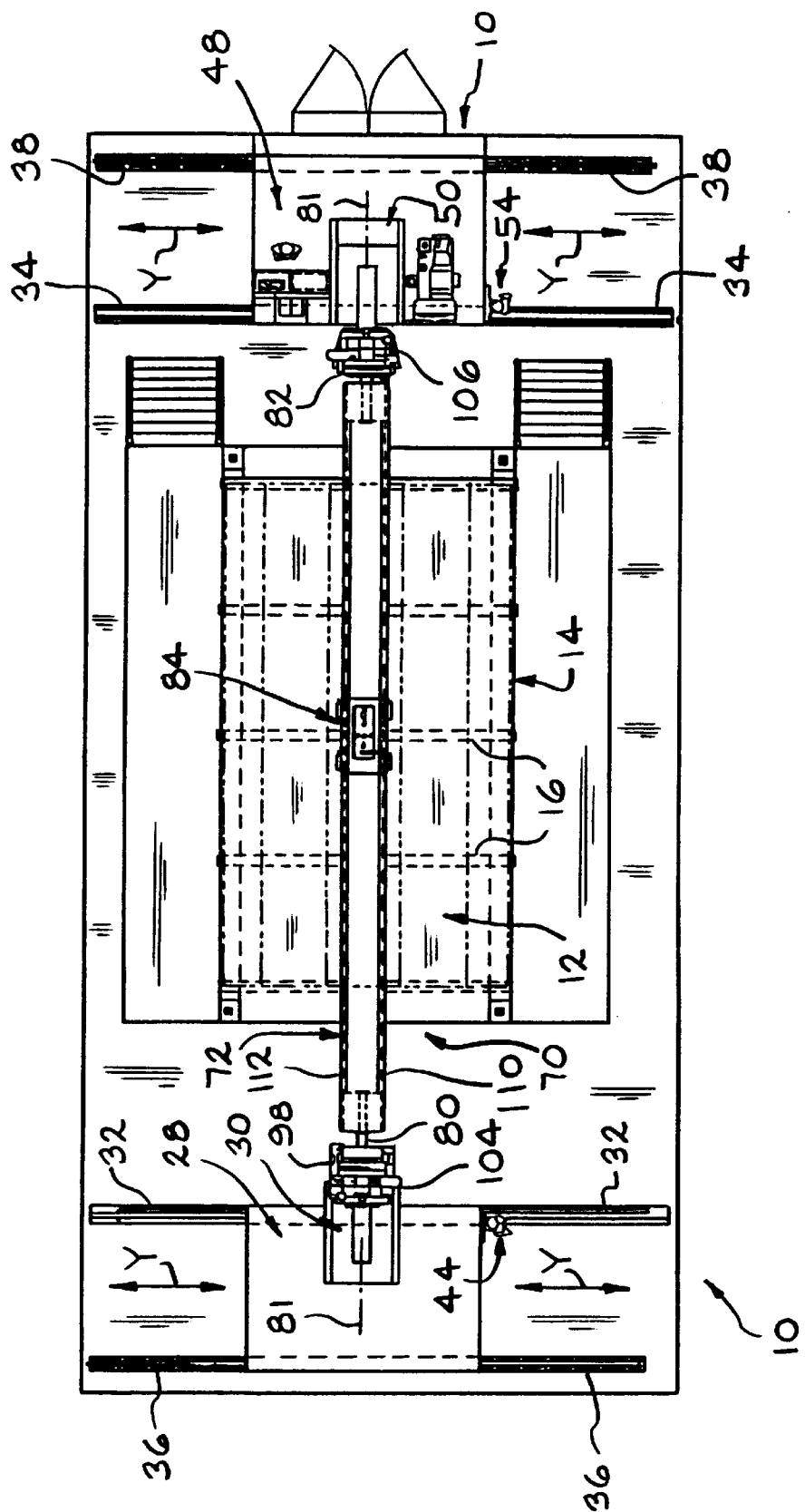
FIG. 2 shows a top plan view of the apparatus of FIG. 1.
Figure 3:
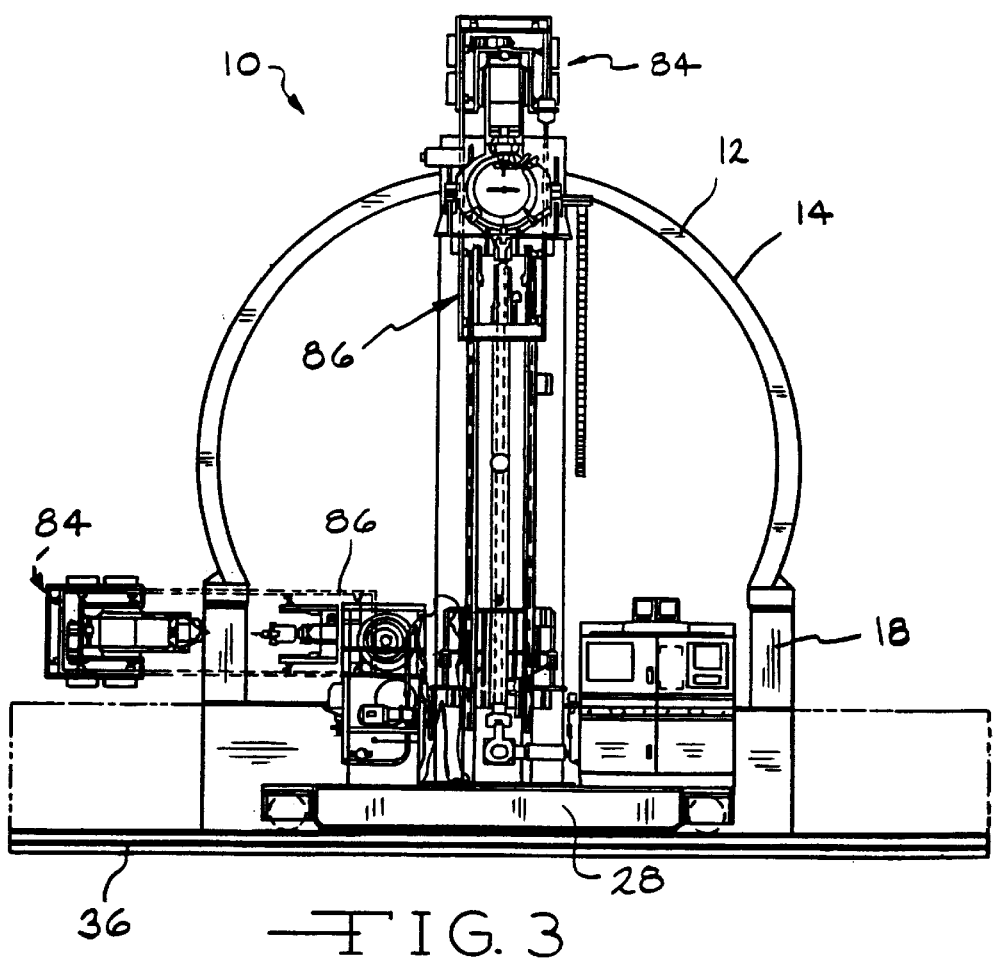
FIG. 3 shows an end elevational view of the apparatus of FIG. 1.
Figure 4:
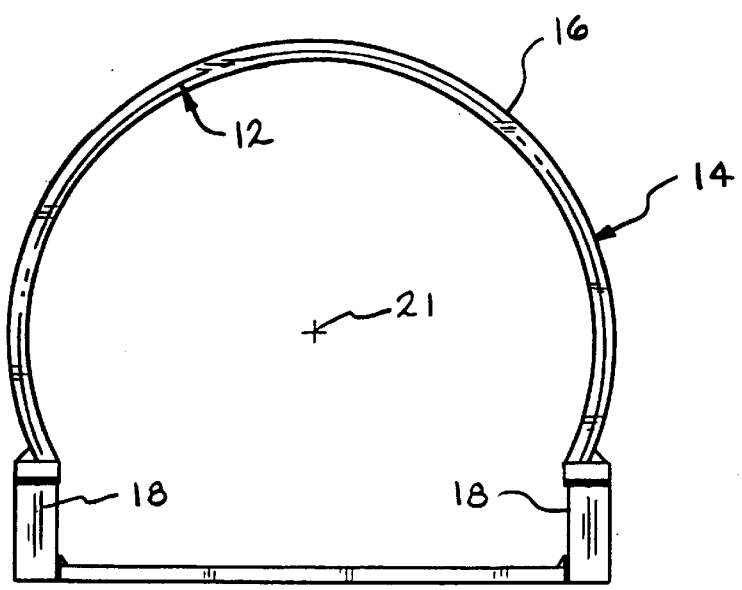
FIG. 4 shows an end elevational view of the workpiece and supporting fixture included with the apparatus of FIGS. 1–3.
Figure 5:
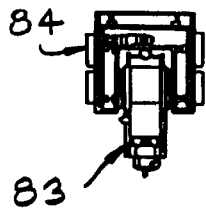
FIG. 5 shows an end elevational view of one of the heads in the apparatus of FIGS. 1–3.
Figure 6:
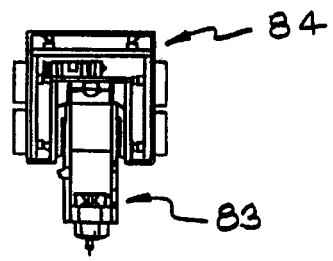
FIG. 6 shows an enlarged view of FIG. 5.
Figure 11:
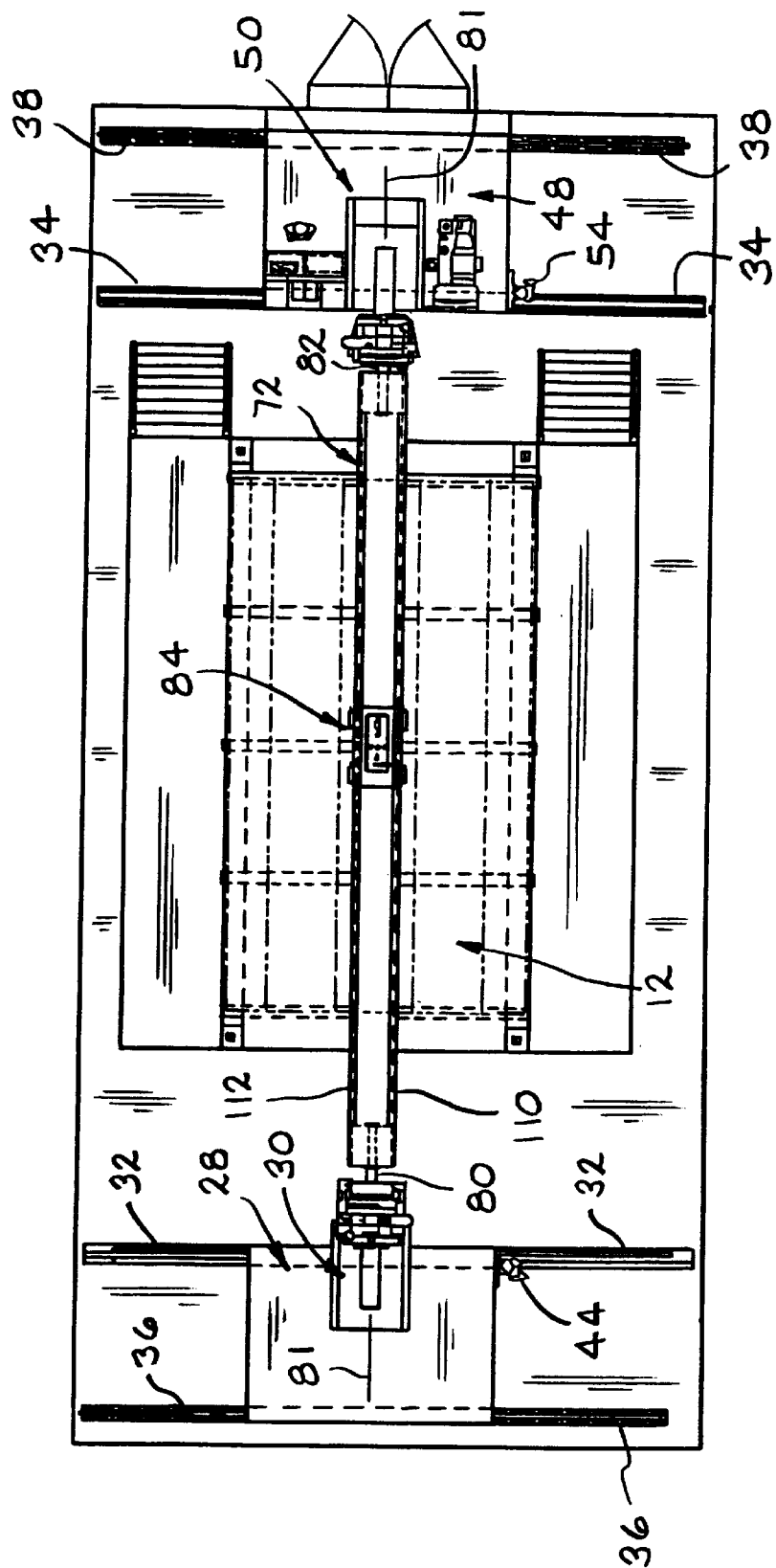
FIG. 11 shows an enlarged view of FIG. 2.
Figure 12:
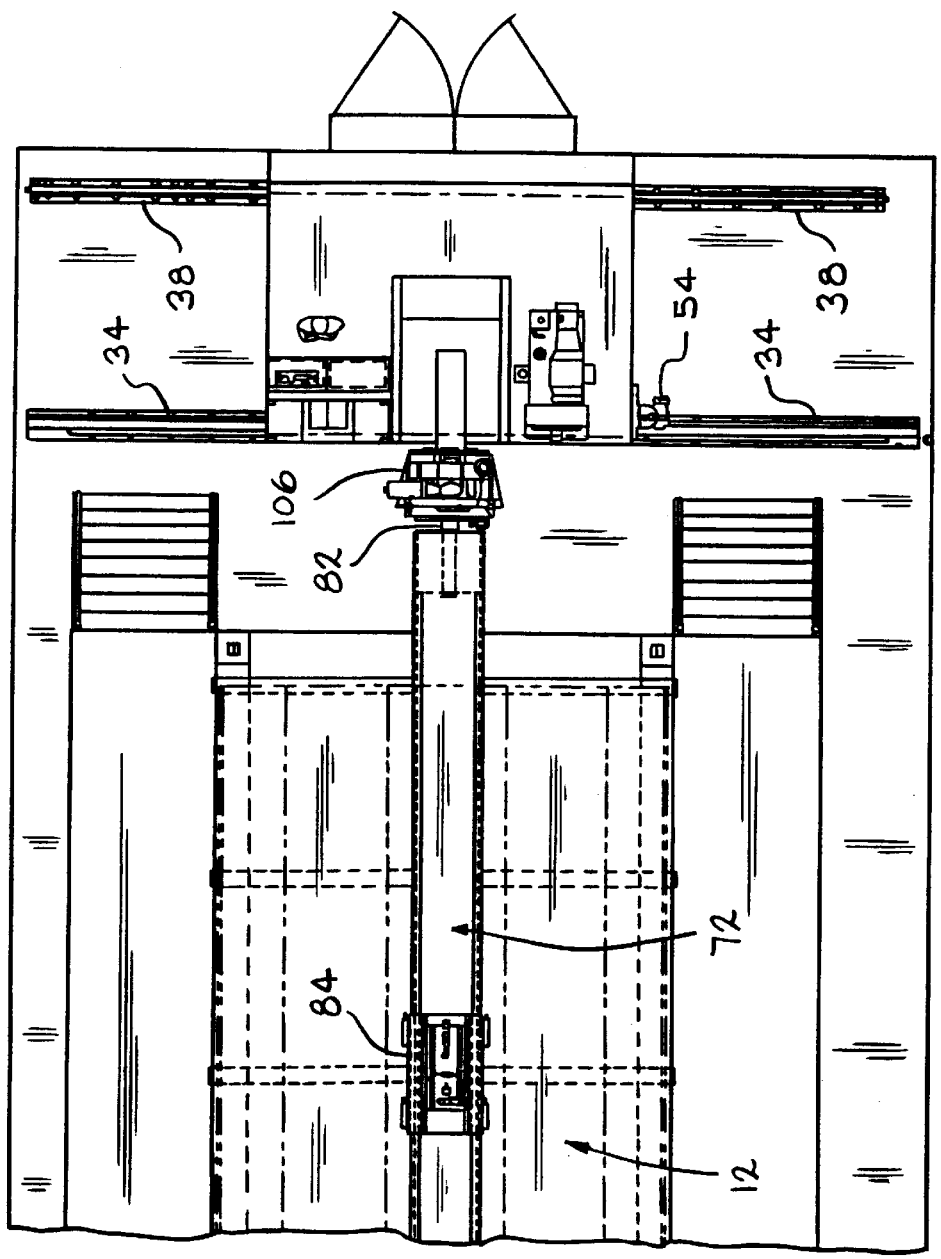
FIG. 12 shows an enlarged fragmentary view of a portion of FIG. 11.

As seen in FIGS. 2, 11, and 12, the Y-axis carriages 28 and 48 are equipped with drive means 44 and 54, respectively, to accomplish movement of the pedestals 30 and 50, respectively, and hence apparatus 10, along the ground tracks 32 and 34, that is along the Y-axis. Drive means 44 and 54 include synchronized servo motors for operating pinions which engage tracks 32 and 34 in a rack and pinion type arrangement. Information on the Y-axis position is obtained by encoder feedback to the system control. Carriages 28 and 30 can be equipped with other controlled drive means, such as ball screw and nut arrangements driven by controlled electric motors or linear electric motor drives. The foregoing movement of carriages 28 and 48 and with them the pedestals 30 and 50, respectively, moves the axes of pivot shafts 80 and 82 and thus the pivot axis 81 of gantry 70 along the Y axis. While the foregoing arrangement is preferred, the pivot axis of gantry 70 could be moved along the Y axis by a different arrangement wherein pedestals 30 and 50 remain stationary. A first traverse beam assembly would be carried by elevator 42 of pedestal 30 and a second traverse beam assembly would be carried by elevator 52 of pedestal 50. The transverse beam assemblies would be disposed generally horizontally in a setup of the type shown in FIGS. 1 and 2 and would extend in the direction of the Y-axis. Pivot shaft 80, slip joint 98 and rotary actuator 104 would be connected to a carriage component mounted in or on the first traverse beam for movement along the beam and hence along the Y axis by suitable controlled drive means such as a rack and pinion drive or ball screw and nut drive. Similarly, pivot shaft 82 and rotary actuator 106 would be connected to a carriage component mounted in or on the second transverse beam for movement along the beam and hence along the Y axis by suitable controlled drive means such as a rack and pinion drive or ball screw and nut drive. As a result, the pivot axis 81 of gantry 70 is moved along the Y axis but with the pedestals 30 and 50 remaining stationary.

Figure 13:
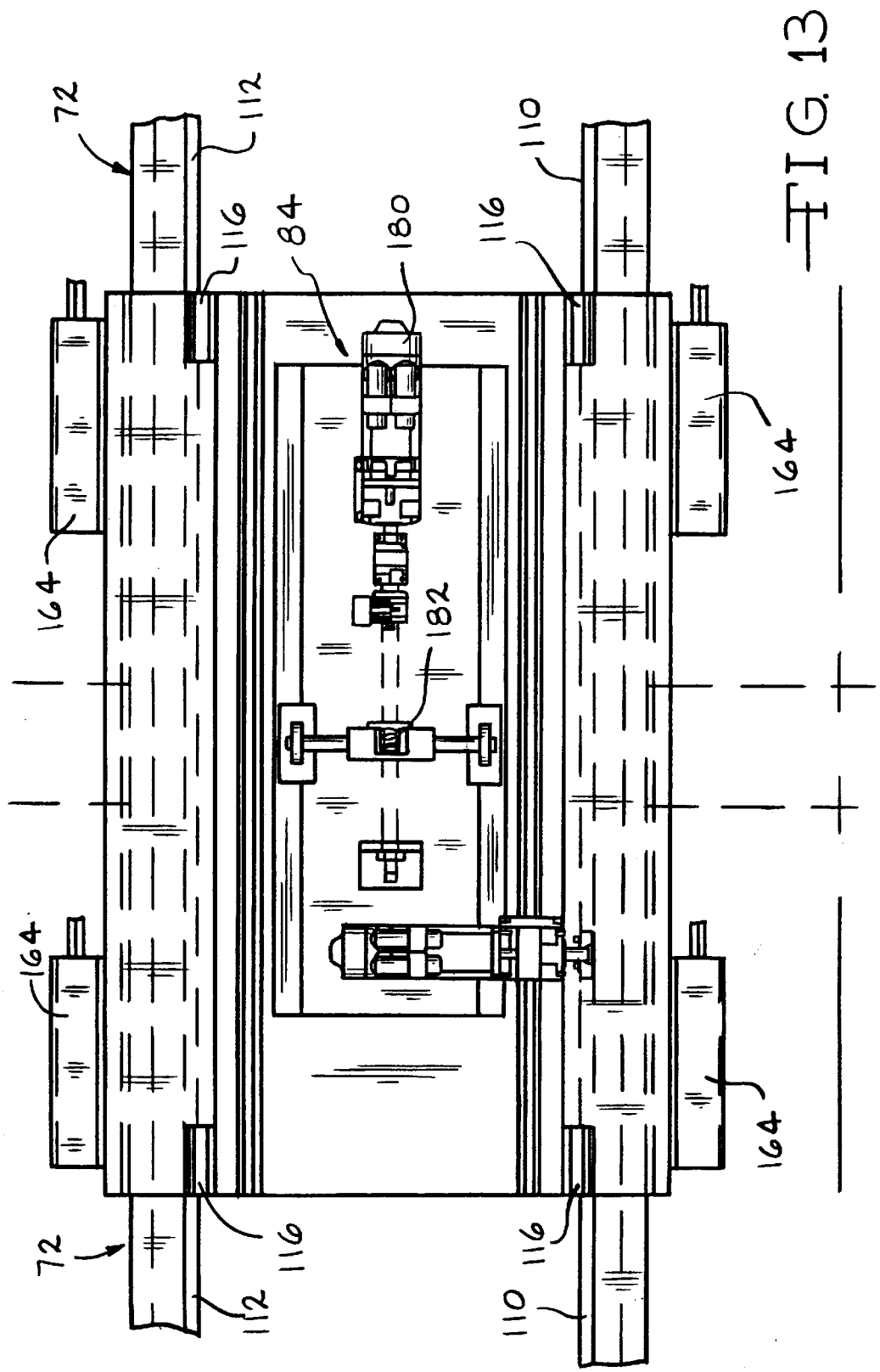
FIG. 13 shows an enlarged top plan view of the head means of FIGS. 5 and 6.
Figure 14:
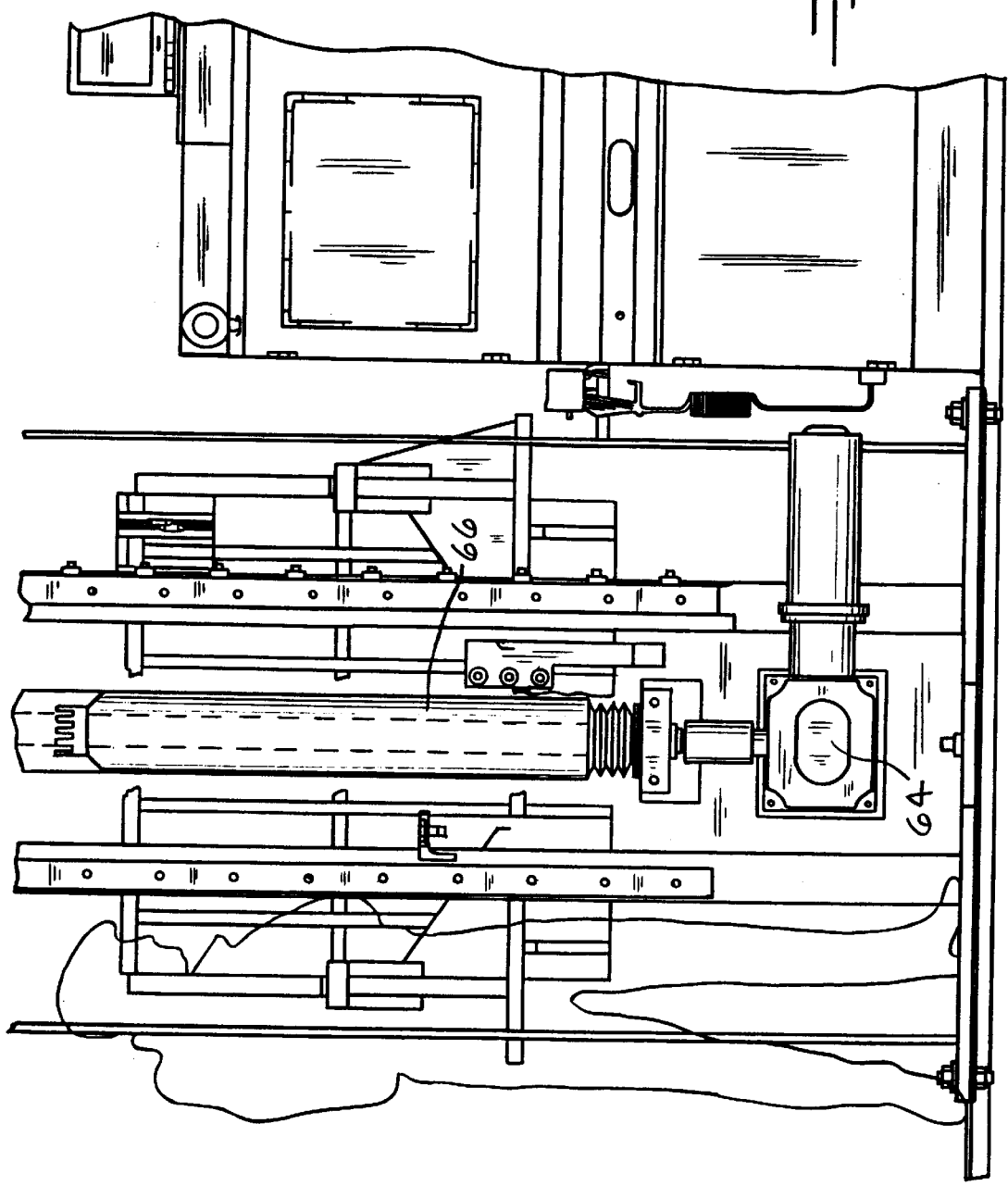
FIG. 14 shows an enlarged fragmentary side elevational view of the Z-axis drive and the console in the apparatus of FIGS. 1–3.
Figure 15:
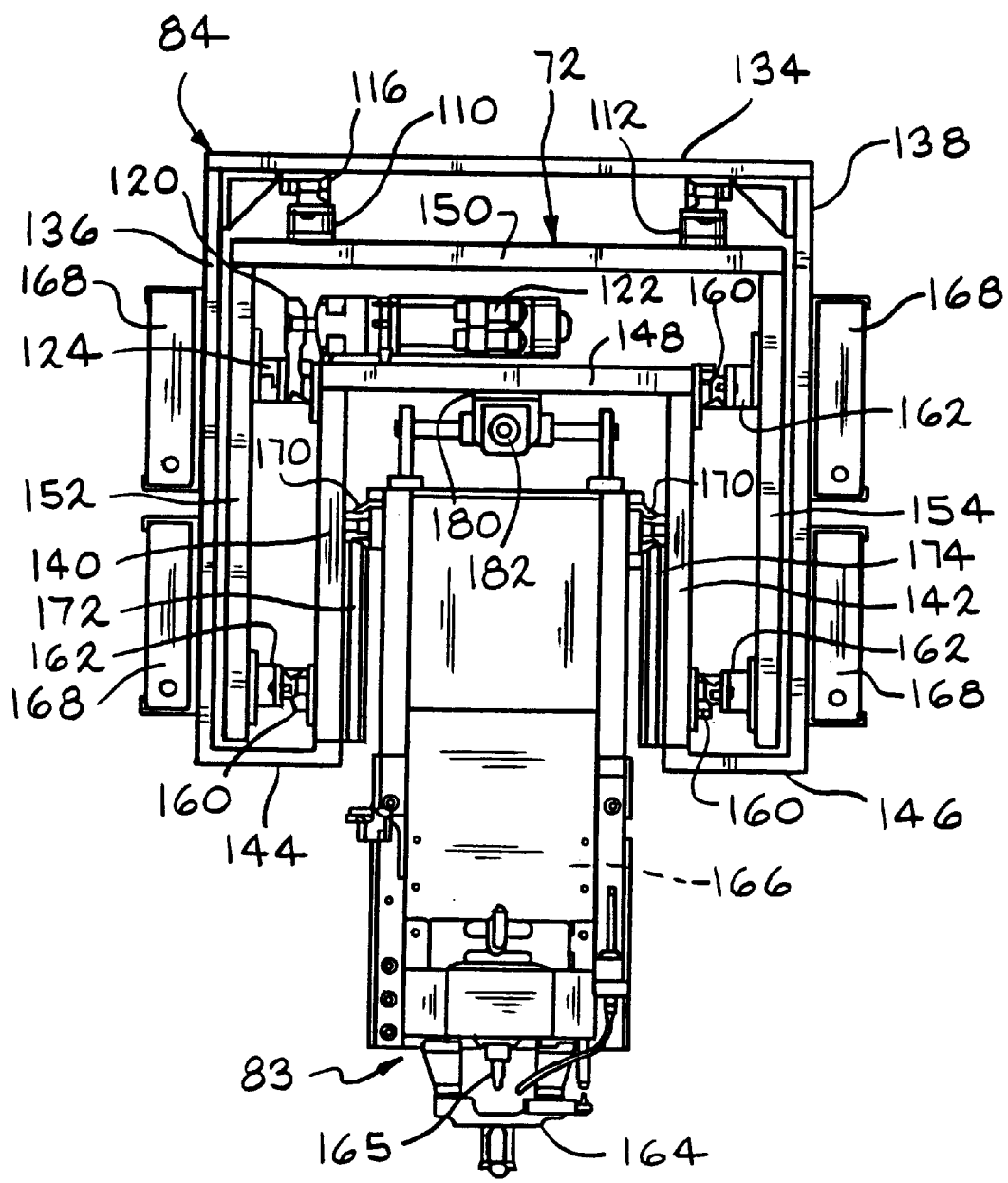
FIG. 15 shows a further enlarged end elevational view head means of FIGS. 5 and 6.
Figure 16:
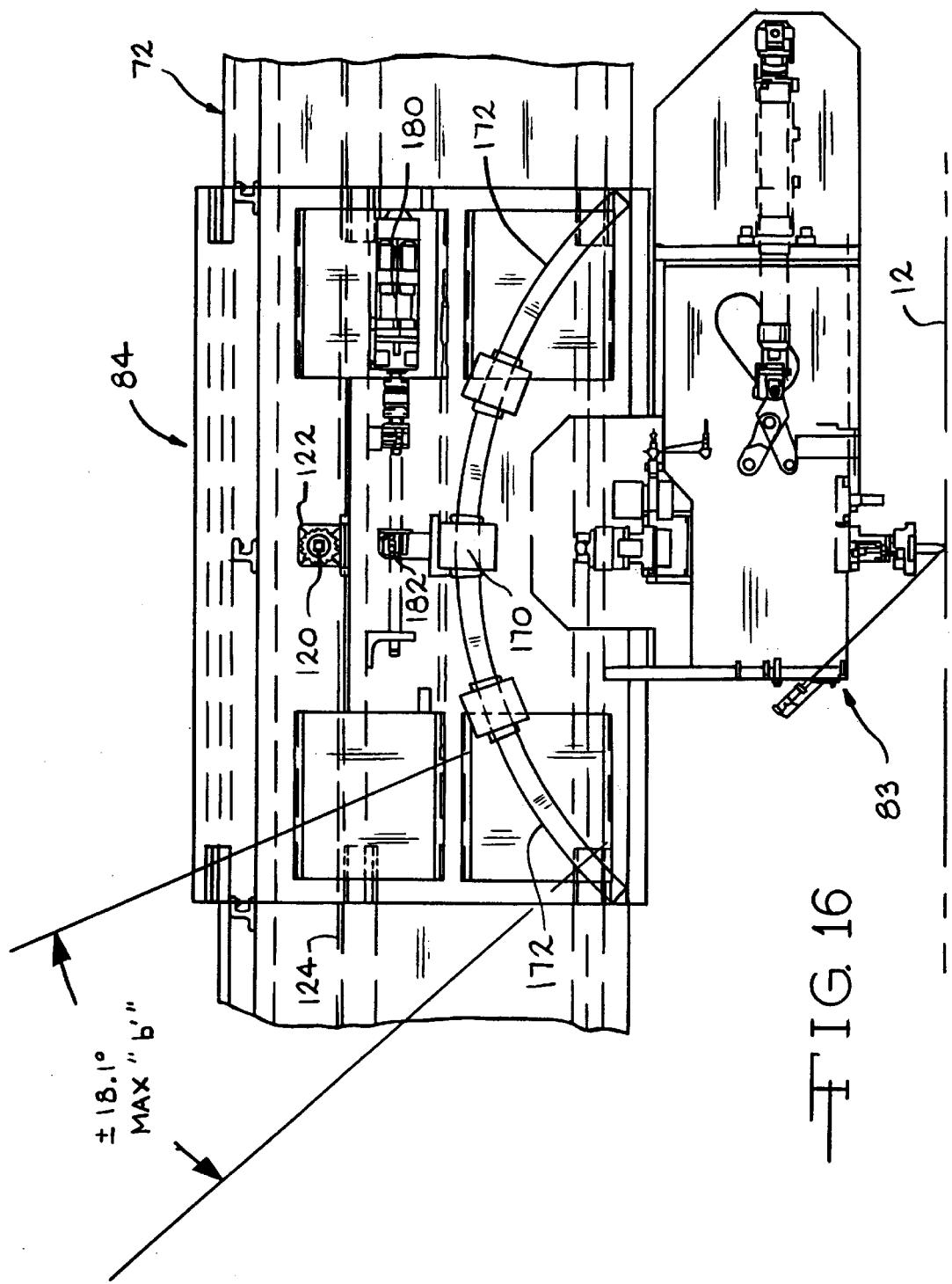
FIG. 16 shows an enlarged side elevational view of the head means of FIGS. 5 and 6 and illustrating the range of motion of the head means.

The apparatus 10 for positioning tooling further comprises first head means 83 in a carriage 84 movably carried by the first beam 72 and second head means 85 in a carriage 86 movably carried by the second beam 74. Each of the head means 83, 85 contain tooling. For example, tools typically carried by head means 83 include a drill, fastener bucking tool, shave tool, sealant applicator, hole probe, router and vision system camera. Head means 85 typically carries a fastener upset tool. Each of the carriages 84 and 86 is movably supported by bearing/guide tracks or linear guide bearings on each of the first and second beams 72 and 74 respectively, for movement along the X-axis. A pair of such tracks 110 and 112 is shown, for example, in FIGS. 2, 11, and 15 on first beam 72. One such track 114 on beam 74 is shown, for example in FIGS. 1, 9, and 17. Bearings 116 on carriage 84 operatively engage tracks 110 and 112 as shown in FIGS. 13 and 15. Each of the carriages 84 and 86 is driven along the first and second beams 72 and 74, respectively, by a rack and pinion type drive arrangement. For example, as shown in FIG. 16, pinion 120 driven by motor 122 on carriage 84 engages a rack 124 extending along beam 72. A similar rack and pinion drive arrangement is provided for the carriage 86, the rack being shown, for example at 126 in FIG. 1. The foregoing can be implemented with integral rack and rail assemblies commercially available from THK under designation GSR-35 which advantageously simplifies machining and alignment. Operation of the X-axis drive motors on the carriages 84 and 86 is synchronized and controlled by the machine control system 230 described below, with position location and synchronized feedback utilizing encoders. An alternative drive arrangement could include a controlled linear electric motor. The first and second beams 72, 74 are of sufficient length to provide a park position of carriages 84, 86 beyond one end of workpiece 12, i.e., the left-hand end as viewed in the drawings to prevent any interference with the workpiece during loading and unloading in the fixture 14.

Referring to FIG. 15, the first head means 83 and carriage 84 are shown in detail. The carriage 84 includes a top wall 134, depending outer side walls 136 and 138, and a pair of inner walls 140 and 142 spaced from walls 136, 138 and joined thereto by bottom wall portions 144 and 146. Inner walls 140 and 142 are joined together by an intermediate wall 148. Carriage 84 thus is in a straddling relation to beam 72 as shown in FIG. 15 where beam 72 has a top or base 150 and depending flanges 152 and 154. In addition to the combination of tracks 110, 112 and bearings 116, movement of carriage 84 along beam 72 also is guided by bearings 160 on carriage walls 140, 142 which engage tracks 162 on beam flanges 152 and 154.

As shown in FIG. 15, head 83 is provided with a pressure foot bushing 164 well known to those skilled in the art, and each tool such as tool 165 illustrated in FIG. 15 is moved toward and away from the workpiece in a known manner by suitable motive means which can be hydraulic or which can be electric such as a roller screw actuator shown and described in U.S. Pat. No. 5,829,115 issued Nov. 3, 1998, the disclosure of which is hereby incorporated by reference.

Also provided on carriage 84 are a plurality of fastener cassettes 168 which hold a supply of fasteners or rivets, and communicate with tool assembly 132 via a rivet feed arrangement (not shown) so as to deliver rivets thereto. Different types or sizes of fasteners can be carried in the different cassettes 168. Such rivet feed arrangements are well known in the art. Carrying a supply of fasteners or rivets on the carriage 84 advantageously avoids having to transport rivets to head means 84 via tubes from a relatively remote storage location on another part of the machine which is particularly advantageous in view of the large size of the workpiece 12. Top wall 134, sidewalls 136, 138 and bottom walls 144, 146 of carriage 84 are provided to accommodate fastener cassettes 168 and can be eliminated if the cassettes are not utilized. Then, carriage 84 would include simply the spaced walls 140, 142.

Carriage 84 also is provided with means for moving the head assembly 83 containing tooling about an axis generally perpendicular to the longitudinal axis of the workpiece. This axis designated the $b^1$-axis and also is perpendicular to the X-axis. Such $b^1$-axis movement is provided in both carriages 84 and 86 for allowing the tool assembly heads 83, 85 carried thereby to be positioned for normalization against the surface of workpiece 12. Such $b^1$-axis movement is in the neighborhood of about 18 degrees, for example. Referring to FIG. 15, the foregoing $b^1$-axis movement in head means 83 is provided by bearings 170 on the head means 83 which ride in curvilinear ways or tracks 172 on carriage inner walls 140 and 142, respectively. The fixed curved rails 172 and traveling bearings 170 comprise a curvilineal bearing set commercially available from THK. A ball screw drive 180, including a servo motor, and nut 182 combination on carriage intermediate wall 148 and on head 83 causes relative movement between the two components which is programmable or under closed loop normality sensor control. This is also illustrated in FIG. 16 where it is seen that nut 182 is connected by member 184 to bearing 170, and as nut 182 advances along the ball screw shaft, bearing 170 moves along track 172 to move head 83 about the $b^1$ axis.

Figure 17:
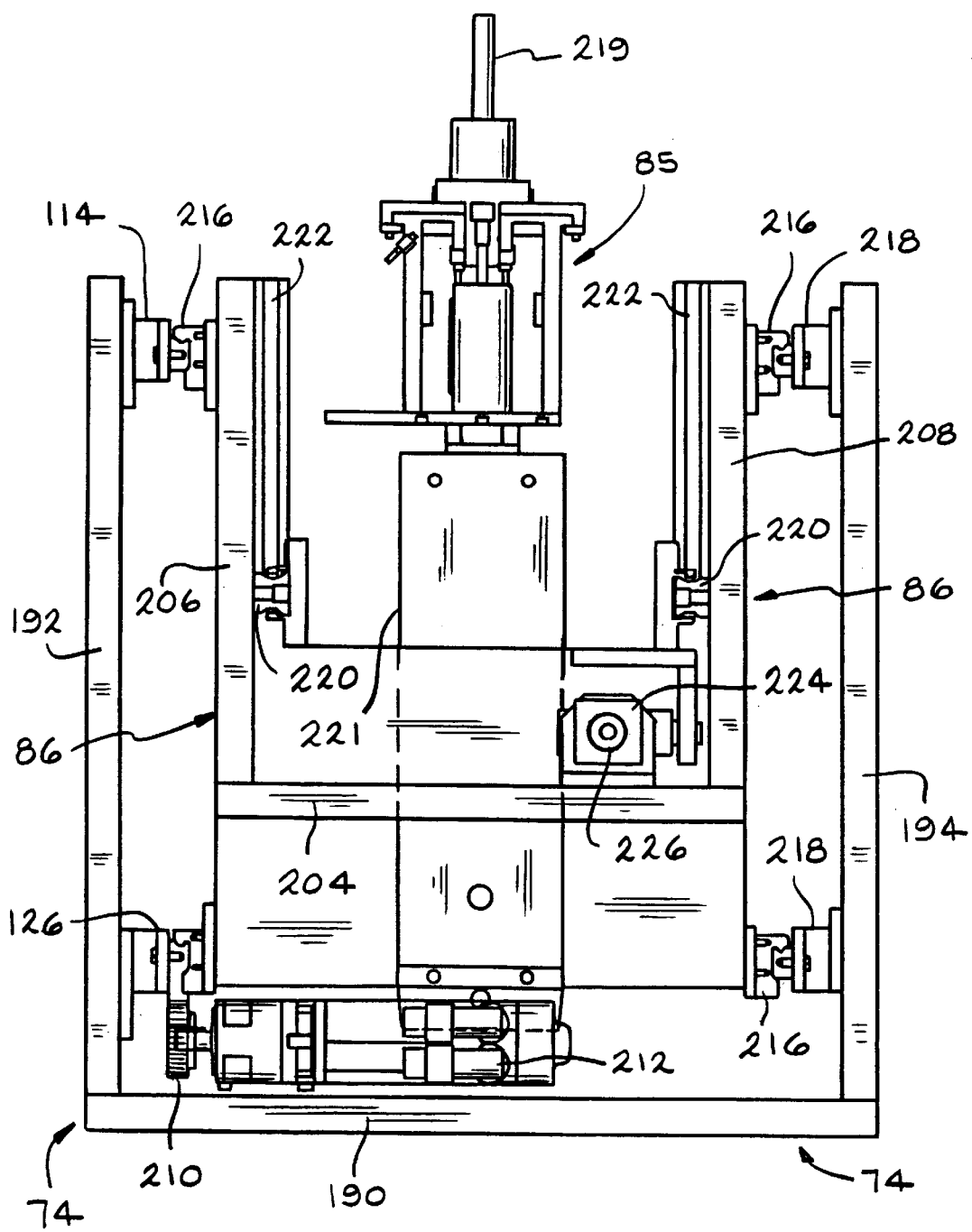
FIG. 17 is an enlarged end elevational view of the other head means in the apparatus of FIGS. 1–3.

Beam 74, shown in further detail in FIG. 17, includes a base 190 and upstanding flanges 192 and 194. Carriage 86 is movable within beam 74 and includes a bottom wall 204 and upstanding walls 206 and 208. Movement of carriage 86 along within beam 74 is effected by a pinion 210 driven by motor 212 on carriage 86 and which engages rack 126 extending along beam 74. The linear movement of carriage 86 along beam 74 is guided by bearings 216 on carriage 86 which ride in tracks 114 and 218 on beam flanges 192 and 194. Head 85, which includes tooling, typically a fastener upset tool as shown at 219, is moved along the above described $b^1$-axis path by the following arrangement. Bearings 220 on the head assembly 85 ride along curvilinear ways or tracks 222 on carriage side walls 206, 208. The fixed curved rails 222 and traveling bearings 220 comprise a curvilinear bearing set commercially available from THK. A ball screw drive 224 including a servo motor on carriage 86 operates a nut 226 mounted on head 85. The $b^1$-axis movement of head assembly 85 likewise is in the neighborhood of 18 degrees, and is programmable or under closed loop normality sensor control. Fastener upset tool 218 is moved toward and away from the workpiece in a known manner by suitable motive means 221 which can be hydraulic or the aforementioned electric roller screw actuator of U.S. Pat. No. 5,829,115.

Figure 7A:
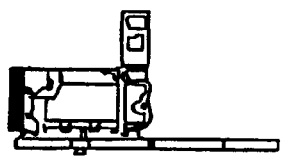
FIG. 7A shows a plan view of the Y-axis driver out of position relative to FIG. 7.
Figure 23:
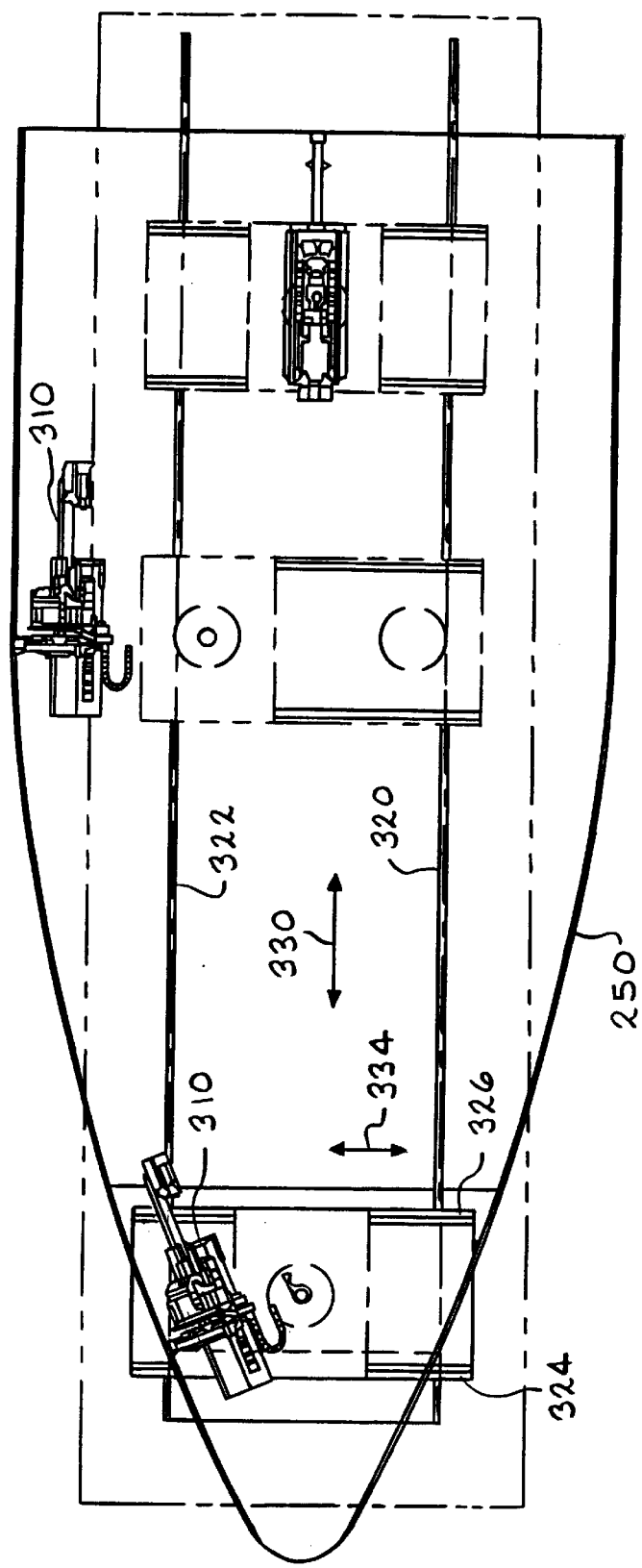
FIG. 23 is a top plan view, partly diagrammatic, of the apparatus of FIG. 22.

The machine control 230, shown in FIGS. 7A, 23, and 24 is in communication with the above described drive components and various encoders and sensors to provide computer controlled guidance to accomplish the controlled movement of the above described components. The result is that machine control 230 moves the components of the positioning tooling apparatus 10 in a controlled manner so that the carriages 84 and 86 and their associated head 83, and 85 containing tooling travel over the entire portion of the surface of workpiece 12 in which fasteners are to be installed. Such computerized control is known to those skilled in the art.

The apparatus 10 for positioning tooling according to the present invention operates in the following manner. The gantry beam assembly 70 is shown in an initial or setup position in FIGS. 3 and 7. In this position, the first and second beams 72 and 74 and the carriages 84, 86 carried thereby are disposed in planes substantially parallel to the planes including the floor or supporting surface 20 and the tracks 32,34 and rails 36, 38. As seen in FIG. 7, the entire gantry beam assembly 70 including carriages 84, 86 are below the upper surface of the fixture base 18. While the gantry assembly 70 is in the setup position the workpiece can be installed in fixture 14 without any interference by the gantry assembly 70. The setup position also enables the cassettes 164 to be replenished with fasteners.

The gantry pedestals 30 and 50, gantry beam assembly 70 and carriages 84, 86 co-operate to position the tooling head 83 and 85 at selected and controlled locations along and about the workpiece 12 in the following manner. Simultaneous movement of pedestals 30 and 50 linearly along the Y-axis, in combination with simultaneous movement of carriages or elevators 42 and 52 linearly along the W and Z axes to move gantry 70 relative to supporting surface 20, moves heads 83 and 85 containing tooling about the circumference of workpiece 12. Thus, the pivot axis 81 of gantry beam assembly is moved along a first path parallel to the longitudinal axes of pedestals 30 and 50 and along a second path substantially perpendicular to these axes. The first path is in the direction of the W and Z axes and the second path is in the direction of the Y axis. In other words, there is movement of tooling heads 83 and 85 along a curvilinear path along a plane perpendicular to the longitudinal axis of workpiece 12. This is illustrated in FIG. 8.

In particular, the W and Z axes drive means 44 and 54, respectively, move the first and second elevator means or carriages 42 and 52 which, in turn, move the gantry assembly 70 carrying heads 83, 85 toward and away from the supporting surface 20 along the W-axis and Z-axis, and the first and second drive means 44 and 54 move the first and second pedestals 30 and 50, respectively, along the tracks 32, 34 and rails 36, and 38, that is along the Y-axis. Simultaneously, in order to accommodate the curvilinear surface of the workpiece, the rotating means 104 and 106 on the first and second pivot assemblies 80 and 82, rotate the gantry beam assembly 70 about the A-axis, such that the heads 83 and 85 do not contact the workpiece 12 during the foregoing positioning movement. Thus, gantry beam assembly 70 is rotated or pivoted about axis 81.

When the first and second head assemblies 83 and 85 are at the location where an operation is to be performed on the workpiece 12, such as drilling, fastener insertion and upset, the drives 180 and 224 operate to move head assemblies 83 and 85, respectively, to accomplish rotation about the $b^1$-axis, which results in normalization of the tools with the point on the surface of the workpiece 12 where the operation is performed. Additional normalization is provided by the movement of heads 83, 85 about the A-axis as previously described. The tools on head 83 are indexed into position and the tools on both heads are moved toward and away from workpiece 12 by the motive means 166 and 221, all in a known manner.

The first and second head means 84 and 86 are also moved along the X-axis so as to be positioned at any other point on the surface of workpiece 12. Further, if the workpiece 12 has a complex curvature, elevator means or carriage and the associated slip joint means communicating with the pedestal may be actuated, while the other elevator means or carriage on the other pedestal is not moved to accommodate such complex workpiece structure, as shown, for example, in FIG. 18.

In a typical fastener installation operation on a workpiece like that shown herein, a first pass of the tooling is made along a path about the circumference of workpiece 12 with fasteners being installed at spaced locations along that path. Then the apparatus is indexed in the X direction whereupon a second pass of the tooling is made to install fasteners at spaced locations along a second circumferential path. This is repeated successively along the X-axis along the entire length of the workpiece 12. Additionally, the first pass of tooling may be made along the longitudinal path of the workpiece, that is indexed along the X-axis to each location where tooling is to be performed on the workpiece. The second pass may of tooling may then be made along the longitudinal axis of the workpiece, that is along the X-axis, but at a different point on the circumference of the workpiece.

All of the above described movement and positioning may be controlled by control means 230. Hence, the apparatus 10 for positioning tooling is capable of accommodating and performing positioning tooling on a variety of differently shaped workpieces. In particular, the apparatus 10 features flexibility in application toward various fuselage body sections utilizing Z-axis and W-axis travel to accommodate different diameters and an adaptive workline to maintain normality of the drill/riveting head to the fuselage skin. The apparatus 10 is usable on uniform as well as tapered fuselage sections. Typical operations include riveting the fuselage section to stringers, riveting seams on the fuselage panels and localized riveting of clips, frames, window belt sections and similar components.

Figure 19:
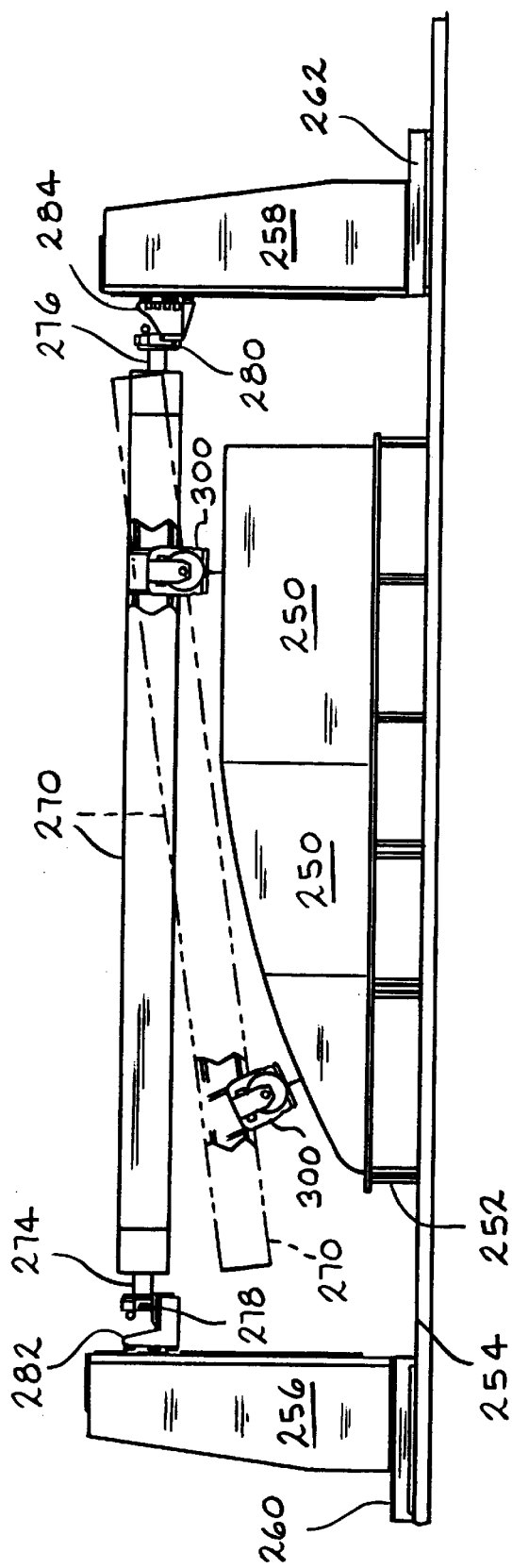
FIG. 19 is a side elevational view, partly diagrammatic, of apparatus according to another embodiment of the present invention.
Figure 20:
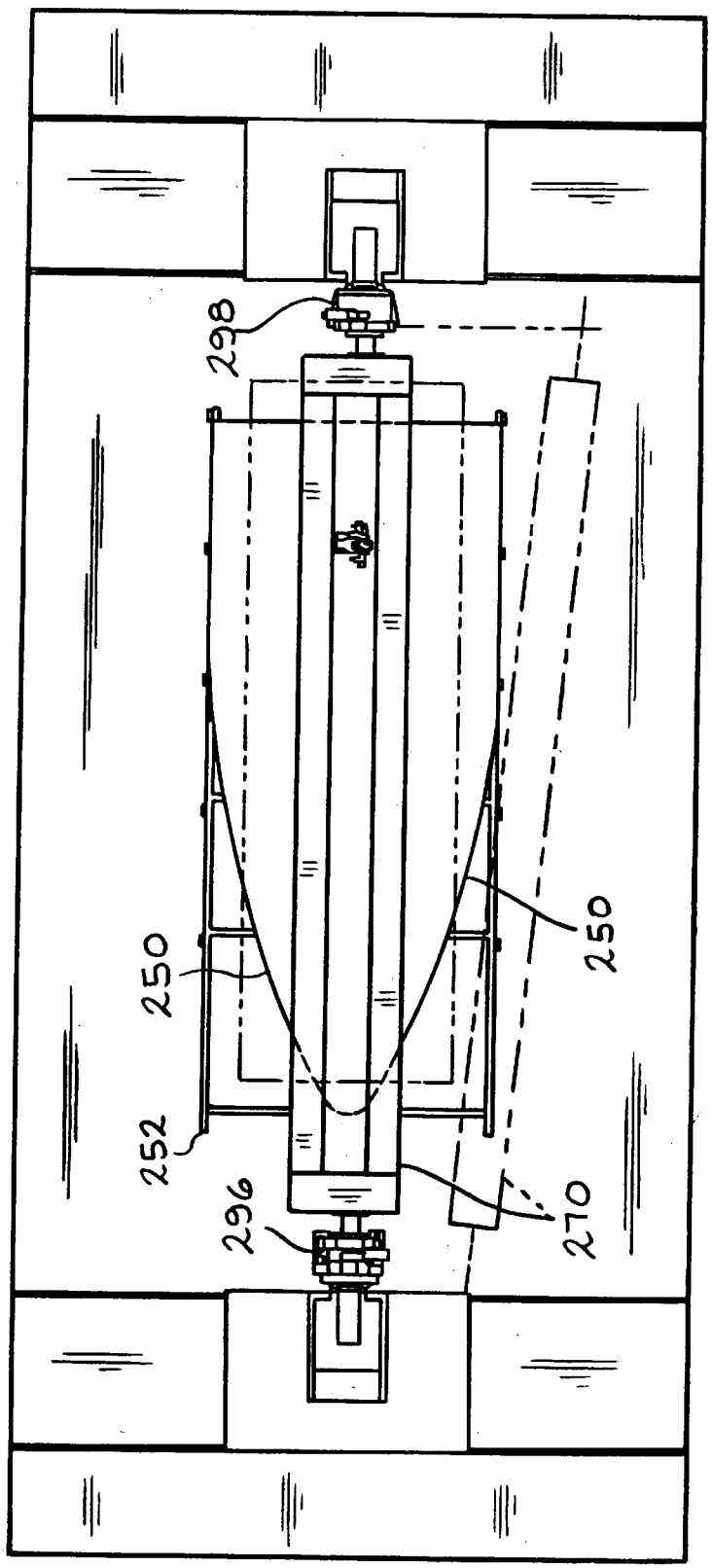
FIG. 20 is a top plan view, partly diagrammatic, of the apparatus of FIG. 19.
Figure 21:
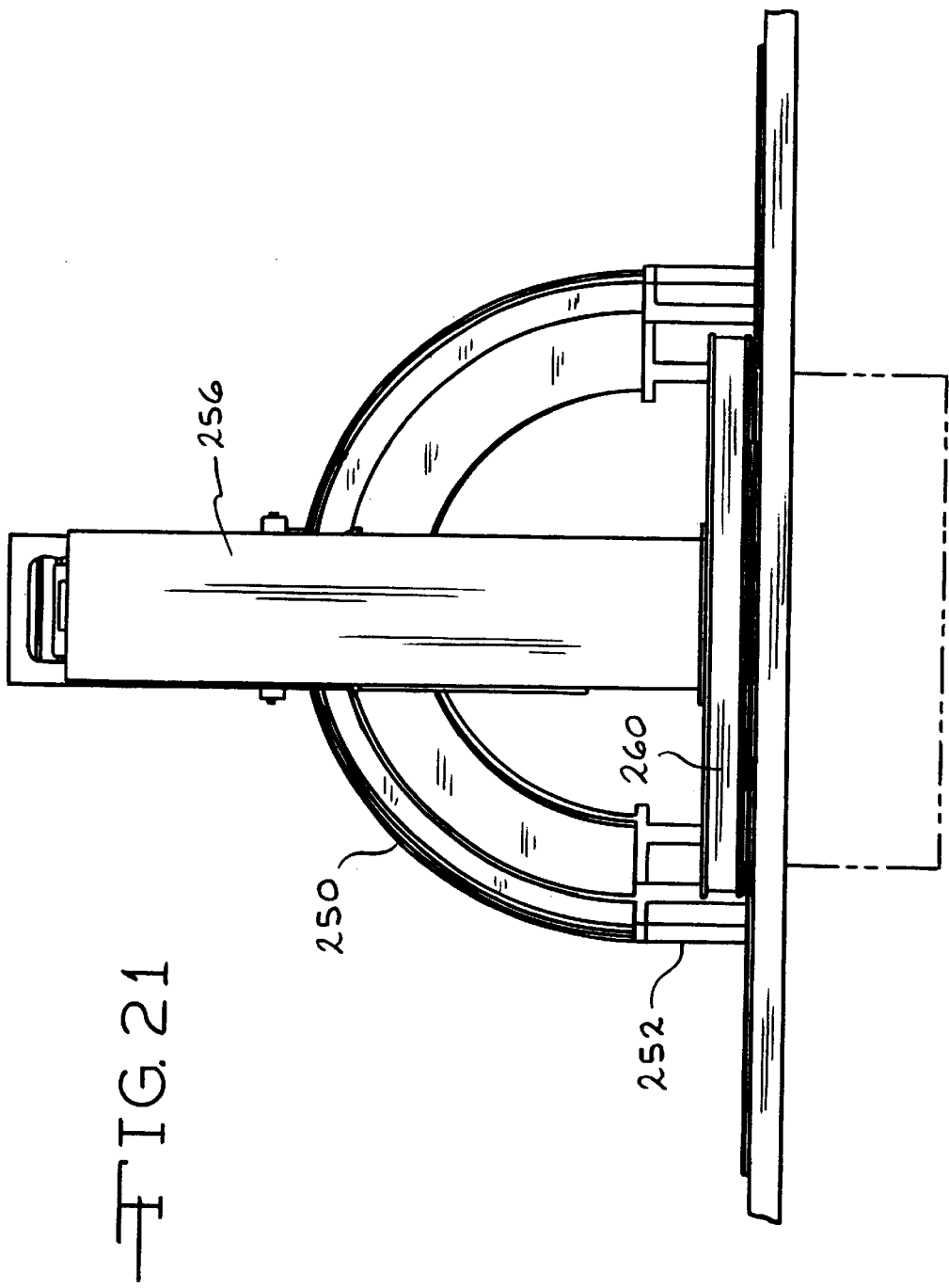
FIG. 21 is an end elevational view of the apparatus of FIGS. 19 and 20.

FIGS. 19–24 illustrated apparatus according to another embodiment of the present invention wherein the gantry beam assembly includes one beam which carries a first head containing tooling for movement relative to one surface of a workpiece. A second head containing tooling is move relative to the workpiece by means physically independent of the gantry. Referring first to FIG. 19 a workpiece 250 of compound curvature, for example a portion of the front end of an airplane fuselage, is supported by a fixture 252 which rests on a supporting surface 254. A pair of gantry pedestals 256 and 258 are supported on carriages 260 and 262 for movement along the Y axis in a manner similar to pedestals 30, 50 and carriages 28, 48 in the embodiment of FIGS. 1–18. A single gantry beam 270 is located between pedestals 256, 258 in a manner similar to the gantry beam assembly 70 of FIGS. 1–18. Gantry beam 270 is connected through shaft assemblies 274 and 276 at opposite ends thereof to controlled rotating means 278 and 280, respectively, which in turn are supported by first and second elevator means 282 and 284, respectively, on pedestals 256 and 258. Thus, the single gantry beam 270 is rotated about the A axis in a manner similar to that of beam assembly 70 in the embodiment of FIGS. 1–18. One of the pivot assemblies, in the present illustration the one associated with shaft assembly 276, may be provided with a slip joint mechanism to allow tilting of gantry beam 270 as shown, for example, in the broken line representation in FIG. 19. Thus, the foregoing movements of gantry beam 270 are substantially similar to those of gantry beams assembly 70 in FIGS. 1–18. In this embodiment, the pivot assemblies include gimbal/spherical bearing mechanisms, represented at 296 and 298 in FIG. 20, to allow the foregoing tilting and to allow additional movements of gantry beam 270 such as at an angle to the X axis as shown, for example, in the broken line representation in FIG. 19. This and other additional degrees of movement of gantry beam 270 enables a head 300 carried thereby to reach all portions of the compound curved surface of workpiece 250. Head 300 in this embodiment carries tooling similar to that carried by head 83 in FIGS. 1–18. Head 300 also is movable about the $b^1$ axis in a manner similar to that of head 83. This together with the movements allowed by the gimbals avoids extreme tilting of beam 270 to reach all portions of the workpiece surface.

Figure 22:
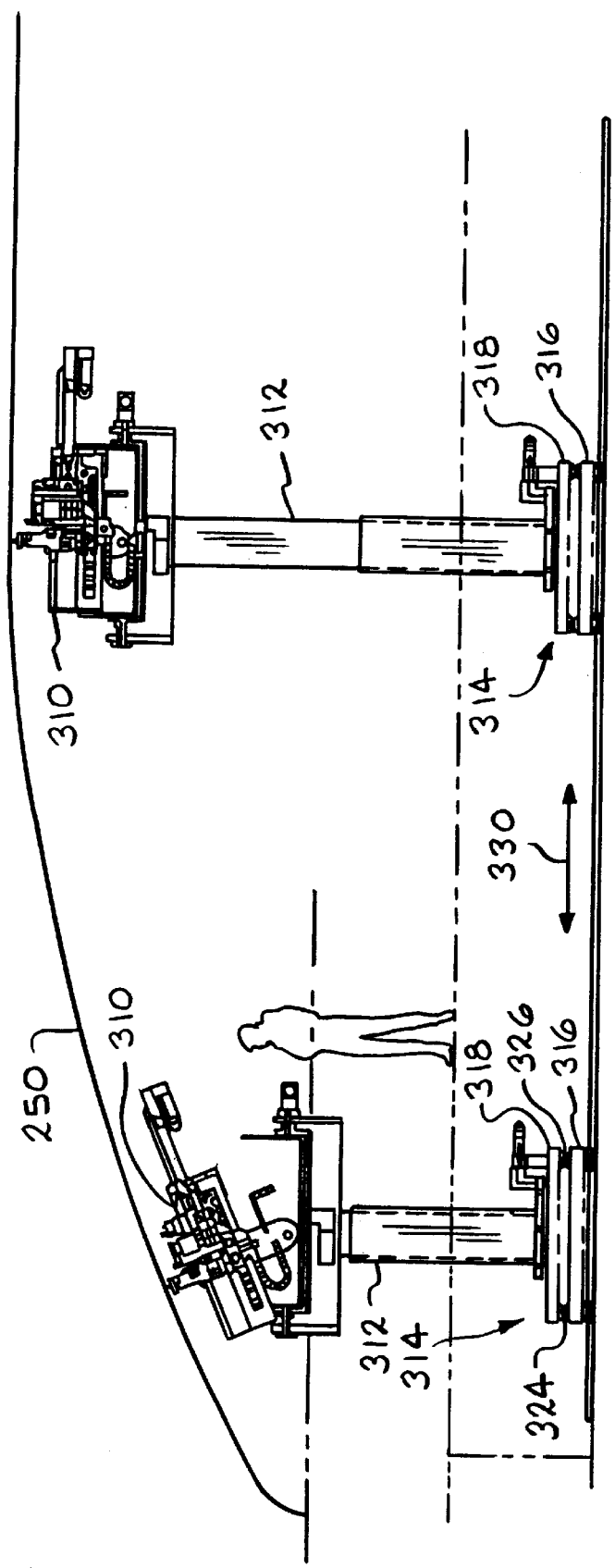
FIG. 22 is a side elevational view, with parts removed and partly diagrammatic, of apparatus for use with the apparatus of FIGS. 19–21.

FIGS. 22–24 illustrate one form of arrangement for moving another head along the opposite surface of workpiece 250 and which is physically independent of the gantry. Gantry beam 270, head 300 and pedestals 256, 258 are omitted from FIGS. 22–24 for simplicity of illustration. Head 310 is supported at the upper end of a telescoping arm assembly 312 the lower end of which is mounted on a carriage assembly 314. Assembly 314 includes a first carriage 316 movable in a first direction which is parallel to the longitudinal axis of workpiece 250 and a second carriage 318 movable on carriage 316 in a direction substantially perpendicular to the first direction. Carriage 316 is driven along tracks 320, 322 by suitable controlled means in a manner similar to that of either carriage 28 or 48 in FIGS. 1–18. Likewise, carriage 318 is driven along tracks 324, 326 on carriage 316 by suitable controlled drive means. Carriage 316 travels in the direction indicated by arrow 330 in FIGS. 22 and 23 which is parallel to the longitudinal axis 332 of workpiece 250. Carriage 318 tracks in the direction of arrow 334 in FIGS. 23 and 24.

Raising and lowering of telescoping arm 312 in the direction of arrow 340 in FIG. 24 in conjunction with movement of carriage 318 in the direction of arrow 334 moves head 310 along the curvature of the inner surface of workpiece 250. This path of movement of head 310 is shown by arrows 346 and 348 in FIG. 24. Head 310 is mounted on the end of arm 312 for b axis movement as shown in FIG. 23, thus being about an axis substantially perpendicular to the longitudinal axis of workpiece 250. FIG. 23 shows head 310 in two different locations and orientation during use. Arm 312 is rotatable about its longitudinal axis indicated by arrow 354 in FIG. 24. This can be accomplished, for example, by a gear 360 mounted on the lower end of arm 312 and rotated by a pinion operated by controlled drive means 362. A more detailed description of a similar telescoping arm assembly may be found in U.S. Pat. No. 5,477,597 issued Dec. 26, 1995 entitled "Apparatus For Positioning Tooling", the disclosure of which is hereby incorporated by reference. Head 310 carries a fastener upset tool similar to head 85 in FIGS. 1–18. The various movements of the arrangement of FIGS. 22–24 associated with head 310 and the gantry arrangement of FIGS. 19–21 associated with head 300 are controlled by the system control.

The apparatus of both embodiments of the present invention operates to install fasteners of various types including rivets, slugs, bolts, Hi-Lok fasteners, Huck-type fasteners, Shure-Lock type fasteners and other. The apparatus of both embodiments of the present invention operates on workpieces of a variety of materials including aluminum, titanium, fiber glass, aluminum honeycomb, carbon-graphite-epoxy, Kevlar and others.

It being understood that various changes in the details, materials, steps and arrangement of parts, which have been herein described and illustrated in order to describe the nature of the invention, may be made by those skilled in the art within the principle and scope of the present invention.

What is claimed is:

1. Apparatus for positioning tooling for operation on a curved workpiece comprising:
  a) a gantry assembly comprising a gantry beam assembly having a longitudinal axis and connected at opposite ends to a pair of spaced apart pedestals each having a longitudinal axis, said gantry beam assembly being connected for pivotal movement about a pivot axis substantially parallel to said longitudinal axis of the gantry beam assembly;
  b) said pedestals being located adjacent opposite ends of the workpiece and said gantry beam assembly extending along the workpiece;
  c) a first controlled drive arrangement operatively associated with said pedestals for moving the pivot axis of said gantry beam assembly along the longitudinal axes of said pedestals;
  d) a second controlled arrangement operatively associated with said pedestals for moving the pivot axis of said gantry beam assembly along a path substantially perpendicular to the longitudinal axes of said pedestals;
  e) head assembly containing tooling for operating on the workpiece and movably carried by said gantry beam assembly;
  f) a controlled drive for moving said head assembly along the longitudinal axis of said gantry beam assembly and
  g) a controlled rotary actuator arrangement operatively associated with said pedestals and said gantry beam assembly for pivoting said gantry beam assembly about said pivot axis.

2. Apparatus according to claim 1, further including:
  a) an arrangement for supporting said head assembly on said gantry beam assembly for movement about a second pivot axis substantially perpendicular to the longitudinal axis of said gantry beam assembly; and
  b) a controlled drive for moving said head assembly about said second pivot axis.

3. Apparatus according to claim 1, further including a slip joint mechanism at one of the connections of said gantry beam assembly to a pedestal so as to permit tilting of said gantry beam assembly along a plane substantially parallel to the longitudinal axes of said pedestals while maintaining disposition of the pedestal.

4. Apparatus according to claim 1, further including gimbal joints in the connections of said gantry beam assembly to said pedestals to provide additional degrees of freedom of movement of said gantry beam assembly to move said head means for operation on a workpiece having compound curvature.

5. Apparatus according to claim 1, wherein said gantry beam assembly and said head assembly carried thereby are located in relation to one surface of the workpiece and further including a mechanism physically separate from said gantry assembly for supporting another head assembly containing tooling for operating on the workpiece and located in relation to an opposite surface of the workpiece.

6. A method of positioning tooling for operating on a curved workpiece comprising the:

a) providing a gantry beam assembly having a longitudinal axis and having a movable head assembly thereon carrying tooling and the beam assembly being pivotally connected on a pivot axis to a pair of spaced apart pedestals, the pivot axis being substantially parallel to the longitudinal axis of the gantry beam assembly, the pedestals each having a longitudinal axis disposed substantially perpendicular to the pivot axis;

b) providing a first controlled drive arrangement operatively associated with said pedestals;

c) providing a second controlled arrangement operatively associated with said pedestals;

d) supporting the workpiece between the pedestals and so that the gantry beam assembly extends along the workpiece;

e) moving the pivot axis of the gantry beam assembly along the longitudinal axes of the pedestals utilizing said first controlled drive arrangement;

f) moving the pivot axis of the gantry beam assembly along a path substantially perpendicular to the longitudinal axes of the pedestals utilizing said second controlled arrangement;

g) pivoting the gantry beam assembly about the pivot axis;

h) moving the head assembly along the gantry beam assembly utilizing a controlled drive; and i) utilizing the tooling to perform operation on the workpiece.

7. The method according to claim 6, further including moving the head assembly about an axis substantially perpendicular to the pivot axis.

8. The method according to claim 6, further including tilting the gantry beam assembly along a plane substantially parallel to the longitudinal axes of the pedestals.

9. The method according to claim 6, further including providing additional degrees of freedom of movement of the gantry beam assembly to move the head assembly for operation on a workpiece having compound curvature.

10. The method according to claim 6, further including providing another head assembly on the gantry beam assembly so that each head assembly provides operations on opposite sides of the workpiece.

11. The method according to claim 6, further including providing a mechanism physically separate from the gantry beam assembly for supporting another head assembly so that each head assembly provides operations on opposite sides of the workpiece.

12. Apparatus for positioning tooling for operation on a curved workpiece comprising:

a) a gantry assembly comprising a gantry beam assembly having a longitudinal axis and connected at opposite ends to a pair of spaced apart pedestals each having a longitudinal axis, said gantry beam assembly being connected for pivotal movement about a pivot axis;

b) said pedestals being located adjacent opposite ends of the workpiece and said gantry beam assembly extending along the workpiece;

c) a first controlled drive arrangement operatively associated with said pedestals for moving the pivot axis of said gantry beam assembly along the longitudinal axes of said pedestals;

d) a second controlled arrangement operatively associated with said pedestals for moving the pivot axis of said gantry beam assembly along a path substantially perpendicular to the longitudinal axes of said pedestals;

e) head assembly containing tooling for operating on the workpiece and movably carried by said gantry beam assembly;

f) a controlled drive for moving said head assembly along the longitudinal axis of said gantry beam assembly; and g) said gantry beam assembly comprises a pair of beams in spaced apart substantially parallel relation, each of said beams having a longitudinal axis substantially parallel to the pivot axis of said gantry beam assembly and wherein said head assembly comprise a pair of heads, one on each of said beams and each carrying tooling for operating on opposite surfaces of the workpiece.

* * * * *

UNITED STATES PATENT AND TRADEMARK OFFICE
CERTIFICATE OF CORRECTION

PATENT NO. : 6,223,413 B1
DATED : May 1, 2001
INVENTOR(S) : Crocker et al.

It is certified that error appears in the above-identified patent and that said Letters Patent is hereby corrected as shown below:

<u>Column 11,</u>
Line 19, delete "the".

Signed and Sealed this

Thirtieth Day of April, 2002

Attest:

Attesting Officer

JAMES E. ROGAN
Director of the United States Patent and Trademark Office